US005616915A

United States Patent [19]

Simpkins et al.

[11] Patent Number: 5,616,915

[45] Date of Patent: Apr. 1, 1997

[54] OPTICAL SENSOR FOR MONITORING THE STATUS OF A BILL MAGAZINE IN A BILL VALIDATOR

[75] Inventors: Joseph A. Simpkins; Scott Hudis, both of West Chester, Pa.

[73] Assignee: Mars Incorporated, McLean, Va.

[21] Appl. No.: 376,781

[22] Filed: Jan. 23, 1995

[51] Int. Cl.$^6$ .............................. G01N 9/04; G06M 7/00

[52] U.S. Cl. ................ 250/221; 250/223 R; 250/559.11; 250/559.12; 250/559.4; 209/534; 209/585

[58] Field of Search ................................ 250/221, 222.1, 250/223 R, 229, 559.11, 559.12, 559.27, 554.4; 209/534, 576, 577, 585; 902/8–17

[56] References Cited

U.S. PATENT DOCUMENTS

| | | |
|---|---|---|
| 2,629,484 | 2/1953 | Thomson . |
| 3,222,507 | 12/1965 | Conri . |
| 3,655,186 | 4/1972 | Bayha . |
| 3,731,799 | 5/1973 | Meloni et al. . |
| 3,851,744 | 12/1974 | Erickson . |
| 3,870,629 | 3/1975 | Carter et al. . |
| 3,917,260 | 11/1975 | Okkonen et al. . |
| 3,934,693 | 1/1976 | Ooyama et al. . |
| 3,966,047 | 6/1976 | Steiner . |
| 3,977,669 | 8/1976 | Douno . |
| 4,011,931 | 3/1977 | Wyckoff . |
| 4,020,972 | 5/1977 | Lundblad . |
| 4,023,011 | 5/1977 | Nakajima et al. . |
| 4,045,017 | 8/1977 | Lundblad . |
| 4,127,328 | 11/1978 | Gorgone et al. . |
| 4,208,589 | 6/1980 | Dashwood et al. ................ 250/559.06 |
| 4,283,708 | 8/1981 | Lee . |
| 4,325,277 | 4/1982 | Uchida et al. . |
| 4,331,879 | 5/1982 | Gersl . |
| 4,349,111 | 9/1982 | Shah et al. . |
| 4,418,824 | 12/1983 | Gorgone et al. . |
| 4,464,787 | 8/1984 | Fish et al. . |
| 4,470,496 | 9/1984 | Steiner . |
| 4,479,049 | 10/1984 | Hirose . |
| 4,490,846 | 12/1984 | Ishida et al. . |
| 4,495,585 | 1/1985 | Buckley . |
| 4,504,052 | 3/1985 | Murck et al. . |
| 4,510,380 | 4/1985 | Uchida et al. . |
| 4,540,081 | 9/1985 | Mori et al. . |
| 4,556,139 | 12/1985 | Akagawa et al. . |
| 4,628,194 | 12/1986 | Dobbins et al. . |
| 4,638,746 | 1/1987 | Ishigure . |
| 4,678,072 | 7/1987 | Kobayashi et al. . |
| 4,722,519 | 2/1988 | Zouzoulas . |
| 4,765,607 | 8/1988 | Zouzoulas . |

(List continued on next page.)

FOREIGN PATENT DOCUMENTS

| | | |
|---|---|---|
| 63-171760 | 7/1988 | Japan . |

OTHER PUBLICATIONS

Panasonic paper–money stacker, model number EUC 76111AS (nine photographs), which has been in the possession of Mars, Incorporated for more than one (1) year prior to the filing date of the application.

Ameel, R.D., "Injection molds," Modern Plastics Encyclopedia, 1986–87, pp. 340–346.

Faig, H., "Injection molding thermoplastics," Modern Plastics Encyclopedia, 1986–87, pp. 252–265.

*Primary Examiner*—Stephone Allen

*Attorney, Agent, or Firm*—Fish & Richardson P.C.

[57] ABSTRACT

A bill validator comprising a removable magazine having reflective surfaces, such as a prism, which reflects light from a light source, such as a light emitting diode, to a photodetector, such as a phototransistor, is disclosed. The prism can include a recess and the magazine can further comprise a blocker with an arm that can be moved into and out of the recess based on movement of a pressure plate within the magazine, to block light from passing across the recess. This arrangement can be used to determine whether the bill validator can go back into service, whether the magazine has been removed from and reattached to the validator, whether bills have been removed from the magazine, whether the magazine is full and whether a bill is in position for stacking, for example.

39 Claims, 24 Drawing Sheets

U.S. PATENT DOCUMENTS

| | | | |
|---|---|---|---|
| 4,775,824 | 10/1988 | Barnes et al. . | |
| 4,784,274 | 11/1988 | Mori et al. . | |
| 4,807,736 | 2/1989 | Kondo et al. . | |
| 4,834,230 | 5/1989 | Kondo et al. . | |
| 4,858,744 | 8/1989 | Doleja et al. . | |
| 4,880,096 | 11/1989 | Kobayashi et al. . | |
| 4,937,460 | 6/1990 | Duncan et al. | 250/559.27 |
| 5,005,688 | 4/1991 | Yukimoto et al. . | |
| 5,200,022 | 3/1992 | Fukudome et al. . | |
| 5,204,537 | 4/1993 | Bennet et al. | 250/559.12 |
| 5,209,335 | 5/1993 | Shuren et al. . | |
| 5,209,395 | 5/1993 | Zouzoulas et al. . | |
| 5,222,584 | 6/1993 | Zouzoulas . | |
| 5,222,626 | 6/1993 | Reinschmidt et al. . | |
| 5,251,738 | 10/1993 | Dabrowski . | |
| 5,260,564 | 11/1993 | Bruggeling et al. | 250/223 R |
| 5,310,062 | 5/1994 | Stevens et al. | 209/584 |

OPTICAL SENSOR FOR MONITORING THE STATUS OF A BILL MAGAZINE IN A BILL VALIDATOR

RELATED APPLICATION

The present case is related to U.S. Ser. No. 08/376,809, filed on the same day as the present case and entitled VALIDATION HOUSING FOR A BILL VALIDATOR MADE BY A TWO SHOT MOLDING PROCESS, assigned to the assignee of the present case.

FIELD OF THE INVENTION

The present invention relates to the magazine portion of a bill validator and, more particularly, a magazine portion of a bill validator including an optical sensing arrangement for monitoring the status of the magazine. For example, the sensor can be used to determine whether the magazine is full, whether sufficient bills have been removed from a full magazine for the bill validator to go back into service and whether an empty magazine has been attached to the bill validator.

BACKGROUND OF THE INVENTION

A variety of bill or currency validation and stacking techniques are known in the prior art, including the following U.S. Pat. Nos. 4,628,194 (METHOD AND APPARATUS FOR CURRENCY VALIDATION), 4,722,519 (STACKER APPARATUS), 4,765,607 (STACKER APPARATUS), 4,775,824 (MOTOR CONTROL FOR BANKNOTE HANDLING APPARATUS), 5,209,395 (METHOD AND APPARATUS FOR A LOCKABLE, REMOVABLE CASSETTE, FOR SECURELY STORING CURRENCY), 5,222,584 (CURRENCY VALIDATOR), 5,209,335 (SECURITY ARRANGEMENT FOR USE WITH A LOCKABLE, REMOVABLE CASSETTE) and Ser. No. 08/376,809, filed Jan. 23, 1995, all of which are assigned to the assignee of the present invention and incorporated by reference herein.

Bill validators typically include a magazine portion for storing authentic bills. When the magazine is full, no further bills can be accepted and the bill validator goes out of service. Regular service calls are required to replace full magazines with empty magazines or to remove some or all of the stored bills so that the bill validator can return to service. A mechanical switch is often provided proximate the magazine portion of the validator to be reset by the service person after the magazine is removed or emptied. Often, the service person forgets to set the switch, leaving the empty bill validator out of service. In addition, mechanical switches are prone to breakage. Mechanical switches have also been provided which automatically set and reset on removal of the magazine or opening and closing of a magazine door.

SUMMARY OF THE INVENTION

In accordance with the present invention, an optical sensor is provided which monitors the status of the bill validator. The sensor can be used to automatically indicate whether a service call has been made, whether the magazine is full, whether the magazine has been reattached so that the validator can go back into service, or whether sufficient bills have been removed from the magazine for the bill validator to go back into service, for example.

In accordance with one embodiment of the invention, a bill validator is disclosed comprising a removable magazine for storing bills. The magazine comprises a front portion through which bills are inserted into the magazine and a rear wall opposite the front portion. A pressure plate moves along a path within the magazine in a first direction as bills are inserted into the magazine and in a second direction as bills are removed from the magazine. First and second reflecting surfaces exposed to the exterior of the magazine are provided. A light source, such as a light emitting diode, is provided proximate the first reflecting surface. The light source directs light toward the first reflecting surface, which reflects the light to the second reflecting surface. A photodetector, such as a phototransistor, is proximate the second reflecting surface. The photodetector detects light reflected from the second reflecting surface. The status of the magazine can be determined based on the level of light detected or the change in the level of light detected, for example.

The first and second reflecting surfaces are preferably part of a prism comprising a face through which light enters at a first location and exits at a second location.

In accordance with another embodiment of the invention, a removable magazine for storing bills in a bill validator is disclosed comprising a front portion through which bills are inserted into the magazine and a rear wall opposite the front portion. A pressure plate moves in a path within the magazine in a first direction as bills are inserted into the magazine and in a second direction as bills are removed from the magazine. First and second reflecting surfaces are provided such that light from a light source in the bill validator can be reflected from the first reflecting surface to the second reflecting surface and the light reflected from the second reflecting surface can be detected by a photodetector. The status of the magazine can be determined based on the level of light detected or the change in the level of light detected, for example.

In another embodiment of the invention, a bill validator is disclosed comprising a removable magazine for storing bills having a front portion through which bills are inserted into the magazine and a rear wall opposite the front portion. A pressure plate moves in a first direction as bills are inserted into the magazine and in a second direction as bills are removed from the magazine. A prism is provided having a first face exposed to the exterior of the magazine. A light emitting diode is provided proximate the prism for directing light into the prism and a phototransistor is provided proximate the prism for receiving light exiting the prism. Control and processing means monitor the level of light detected by the phototransistor such that, when the magazine is removed from the bill validator, a low level of light is detected and when the magazine is reattached to the validator, a higher level of light is detected.

DETAILED DESCRIPTION OF THE INVENTION

Figure 1:
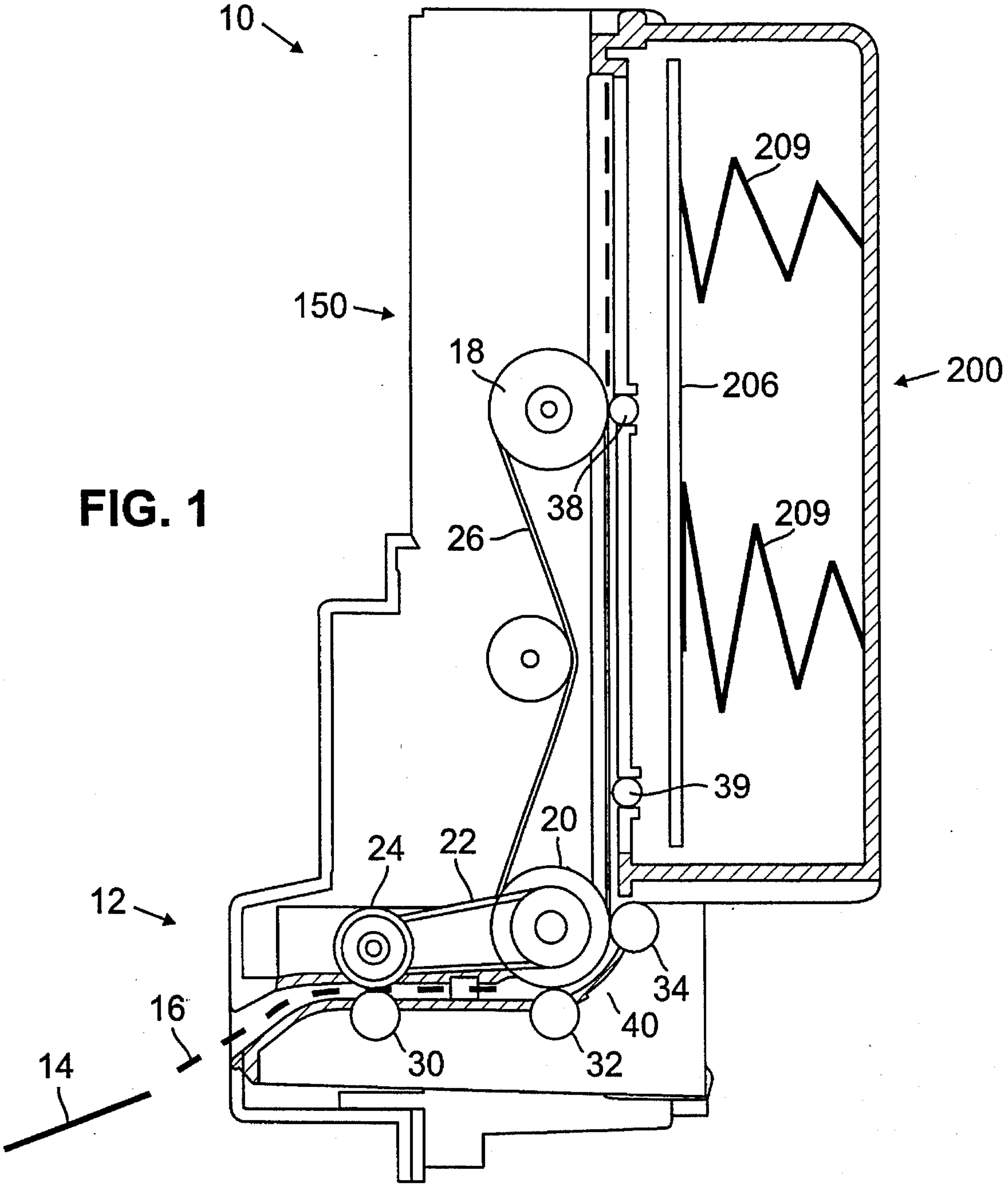
FIG. 1 is a partial cutaway view of an exemplary bill validator.

Prior to discussing the magazine portion of the bill validator in accordance with the present invention, an exemplary bill validator will be described. FIG. 1 is a cutaway view of a bill validator 10 with components removed to aid in illustrating the path of a bill through the validator. The bill validator 10 comprises a validation portion 12, a transport and stacking portion 150 and a magazine portion 200. The path of a bill 14 through the validator is indicated by dotted line 16.

Figure 13:
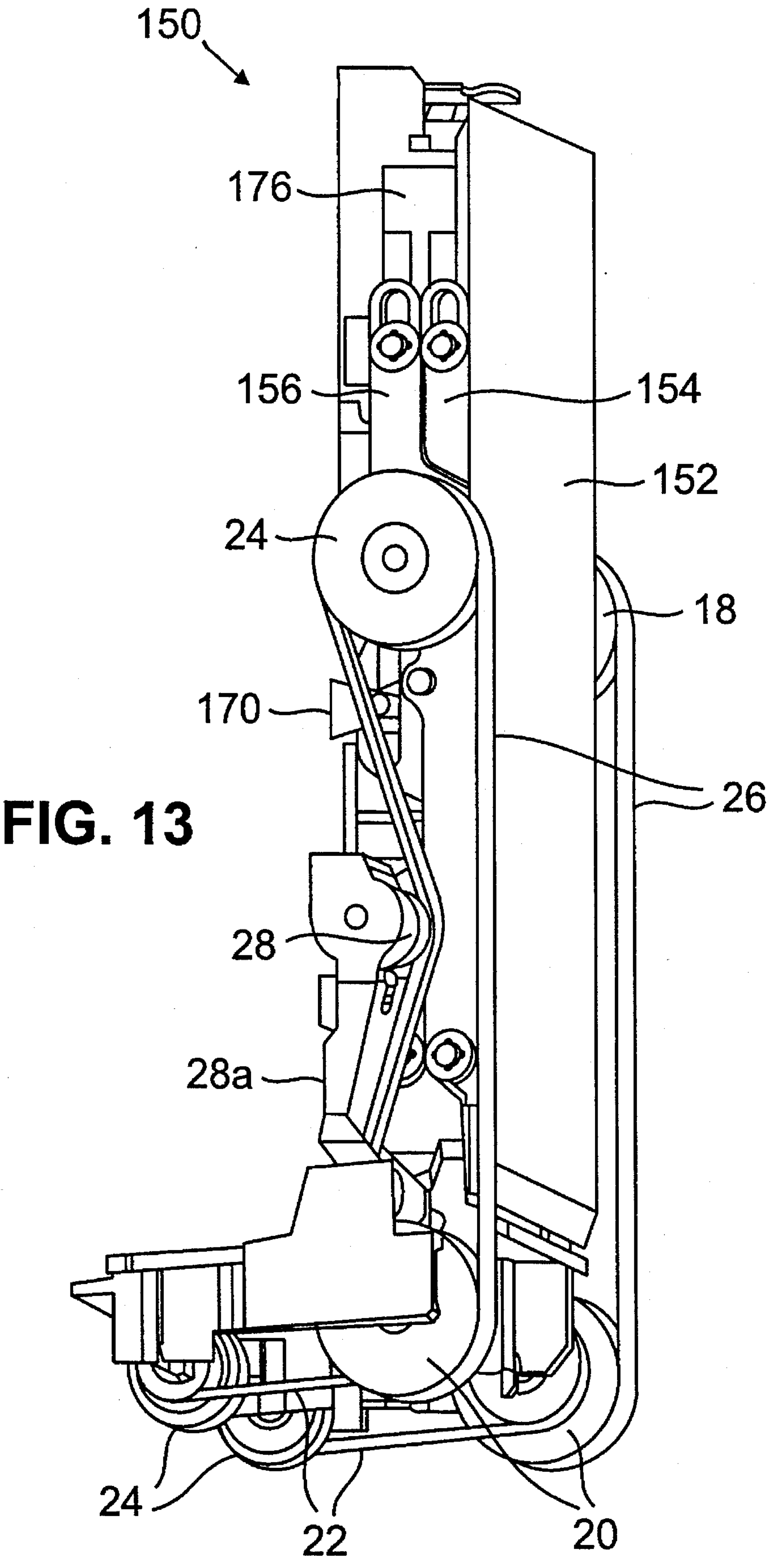
FIG. 13 is a perspective view of the transport and stacking portion of the bill validator.

A preferred transport system comprises a pair of drive rollers 18, a pair of first driven rollers 20 and a pair of second driven rollers 24 provided on one side of the bill path 16. The first pair of driven rollers 20 are coupled to the pair of driving rollers 18 by a pair of toothed belts 26. The second pair of driven rollers 24 are coupled to the first pair of driven rollers 18 by a pair of toothed belts 22. The rollers 18, 20 and 24 include teeth for being engaged by the teeth of the belt, as is known in the art. A pair of rollers 28 preferably bear against the belts 26 to maintain the proper tension on the belts during operation in the forward or reverse directions. Only one of each pair of each roller and belt are shown in the view of FIG. 1. FIG. 13, a perspective view of the stacking portion 150, shows both pairs of each of the above components.

On the opposite side of the bill path 16, pairs of spring loaded rollers 30, 32 and 34 are provided bearing against the first pair of driven rollers 20 and the second pair of driven rollers 24. The pressure of the spring loading of rollers 30, 32 and 34 is preferably about 0.44 lbs. (1.95 newtons). The pressure of the spring loading on rollers 38 and 39 is preferably about 0.05 lbs. (0.24) newtons. A motor 176 (shown in FIGS. 14–16) is coupled to the pair of driving rollers 18 through coupling gears (not shown). One advantage of this arrangement is that the pair of belts 22, which only drive the pairs of rollers 24 and do not convey the bill, are not positioned within the bill path 16. Belts positioned within the bill path can interfere with cross-channel sensing.

Figure 2:
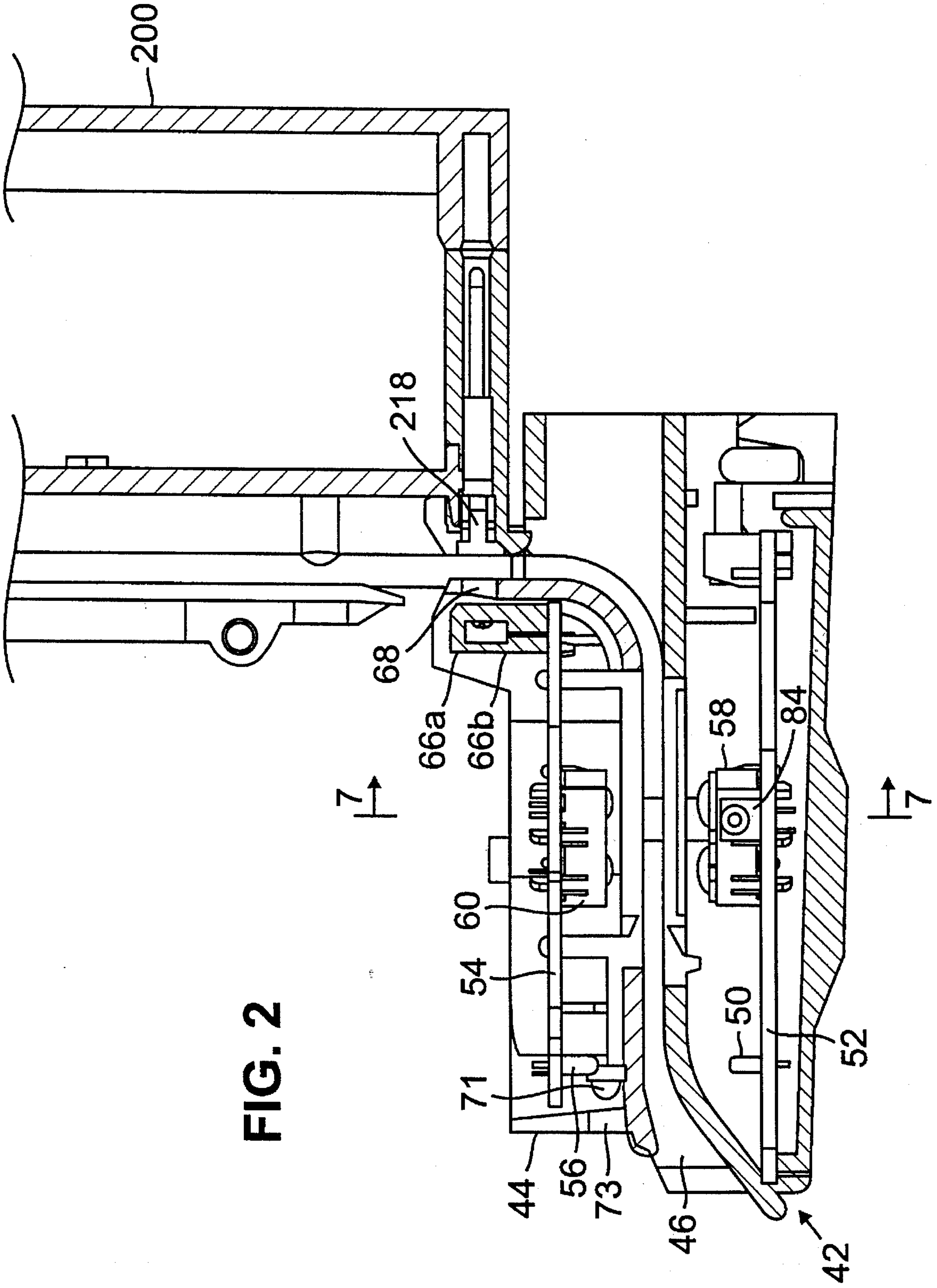
FIG. 2 is a partial cutaway view of the validation portion of the bill validator of FIG. 1.
Figure 24:
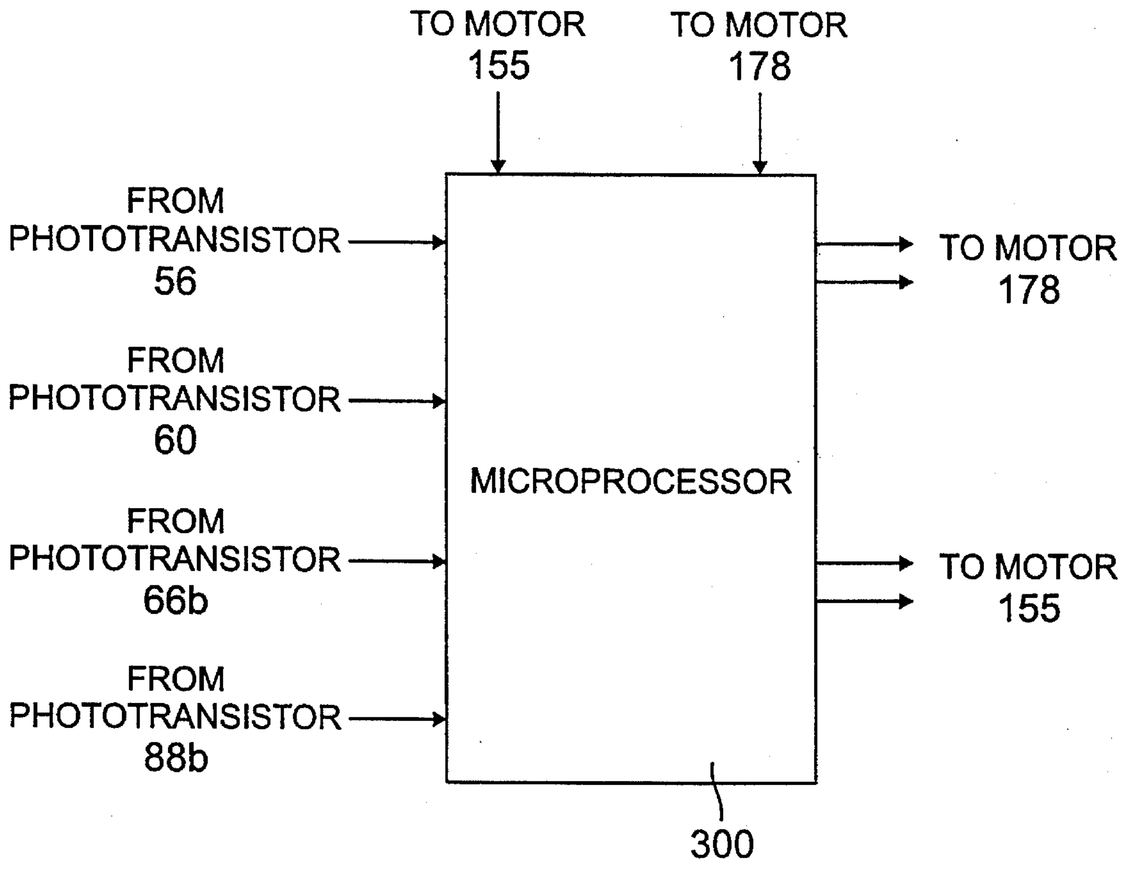
FIG. 24 is a schematic of certain of the inputs and outputs of a microprocessor which can control the operation of the bill validator.

A bill 14 inserted into the validation portion 12 of the validator 10 will be engaged by the second pair of driven rollers 24 and passive rollers 30, which convey the bill past validation sensors discussed with respect to FIG. 2. The bill is advanced to the first pair of driven rollers 20 and passive rollers 32 and then 34, up a curved portion 40. If the bill is acceptable, it will continue to be conveyed up to the pair of driving rollers 18 and passive rollers 38, which advance it to the end of the bill path 16 into its position for stacking in the magazine portion 200. If the bill is unacceptable, skewed, or has a foreign matter such as string attached to it, the motor 176, which can be controlled by a control and processing circuit, such as a microprocessor 300 shown in FIG. 24, can be reversed. A pair of passive rollers 39 are also provided bearing against the pair of coupling belts 26 to provide additional pinch points for conveying the bill. FIG. 1 also shows a pressure plate 206 and conical springs 209 in the magazine portion 200, which is described further, below, with respect to FIGS. 17–21.

FIG. 2 is a partial cross-sectional view of a preferred validation portion 12 of the bill validator 10, also showing the lower portion of the magazine portion 200. The rollers and belts shown in FIG. 1 are removed to more clearly show sensors not shown in FIG. 1. The validation portion 12 comprises a lower housing 42 and an upper housing 44. The housings and their method of manufacture in accordance with one aspect of the present invention are described, below.

Figure 3:
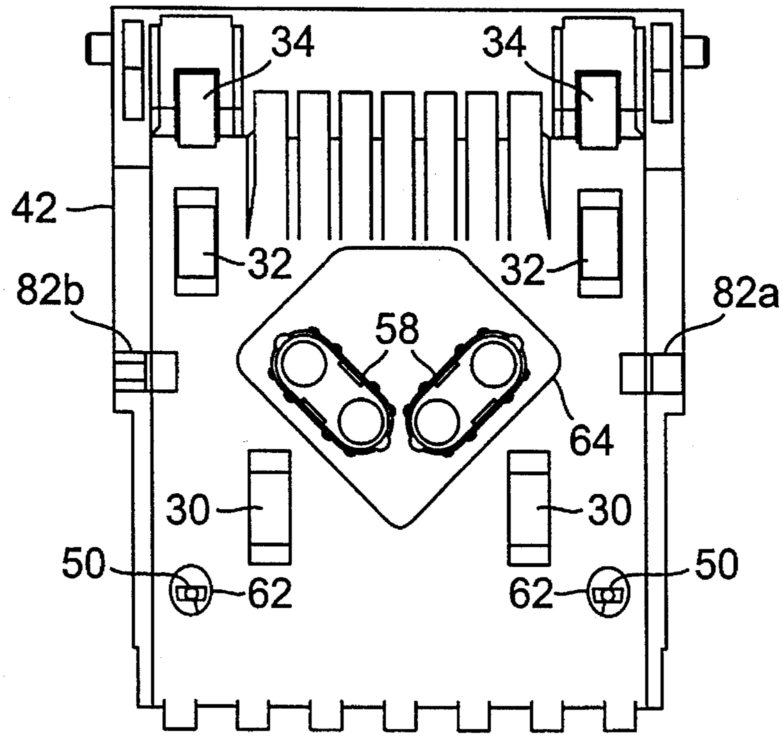
FIG. 3 is a top view of the top surface of the lower housing of the validation portion.
Figure 4:
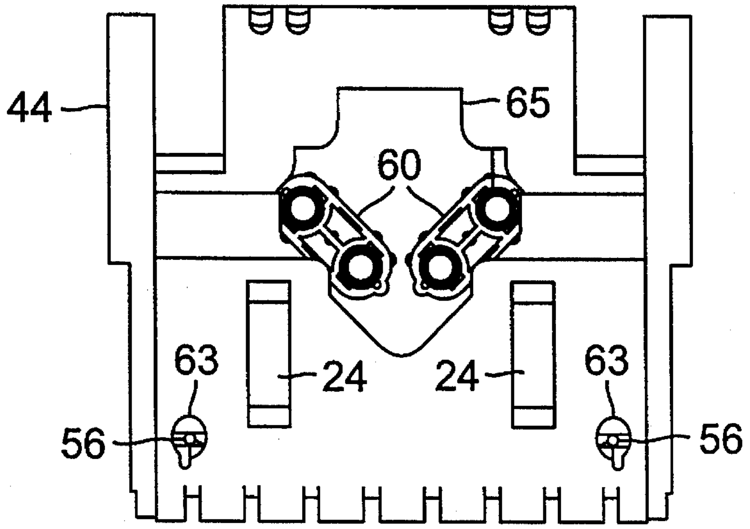
FIG. 4 is a top view of the bottom surface of the upper housing of the validation portion.

The lower housing 42 and upper housing 44 define a bill entry 46. Two light sources, such as LED's 50 (only one of which can be seen in the view of FIG. 2) are preferably provided in the lower housing 42 just within the bill entry 46, prior to the second pair of driven rollers 24. The LED's 50 can be mounted to another printed circuit board 52. In the upper housing 44, mounted to a printed circuit board 54, are a corresponding pair of photodetectors, such as phototransistors 56. Windows 62 in the lower housing 42 allow the light to pass through the housings, across the bill path. FIG. 3 is a top view of the lower housing 42, showing the window 62. Windows 63 in the upper housing 44 similarly allow light to pass through that housing to the phototransistors 56. FIG. 4 is a bottom view of the upper housing 44, showing the window 63. When light from one or both LED's 50 is obstructed by an inserted bill, a processing and control circuit, such as the microprocessor 300 shown in FIG. 24, activates the motor 176 to turn on the pairs of drive rollers 18. An excessively skewed bill, which can be detected by unequal obstruction of the LED's 50 or excessive current draw by the motor 176, as is known in the art, can be returned by reversing the motor. An essentially straight bill 14 engaged between the second pair of driven rollers 24 and passive rollers 30 will be transported along the bill path for validation. Other types and configurations of start sensors can be used, as well.

Validation LED's 58 are also preferably mounted to the printed circuit board 52. Two are shown in supporting lens holders in the side view of FIG. 2. Two others are preferably provided behind those shown in FIG. 2, as shown in FIG. 3. Other types of light sources can be used to examine the bill, as well. FIG. 3 also shows a window 64 provided in the lower housing 42 to allow light to pass through the housing from the LED's 58. The window is transparent to the light emitted by the LED's 58. A window 65, also transparent to the light emitted by the LED's 58, is similarly provided in the upper housing 44 to allow light transmitted through the bill to pass through the upper housing 44 to photodetectors, such as phototransistors 60, also shown within supporting lens holders. The phototransistors 60 are arranged in a similar pattern as the LED's 58. See FIG. 4. The validation LED's 58 and phototransistors 60 can be provided in either housing. If it is desired to detect light reflected from the bill instead of or along with detecting light transmitted through the bill, phototransistors would be provided on the same printed circuit board as the LED's 58, as is known in the art. Signals are provided from the phototransistors 60 to a processing and control circuit, such as the microprocessor 300, for analysis, also as is known in the art.

The LED's 58 can have a dual pellet configuration, emitting light at two wavelengths, such as red and infrared, or can emit light at a single wavelength. The phototransistors 60 can similarly detect light at those two wavelengths. Analyzing a bill at two different wavelengths provides additional information for verifying the authenticity of a bill than analyzing at a single wavelength. LED's emitting at other wavelengths, such wavelengths corresponding to green, can be used as well. Clear windows are preferred to potentially accommodate all wavelengths of light. A suitable LED emitting in the red and infrared ranges is an OP 4460 from Optek Technology, Inc., Carrollton, Tex., for example. A suitable LED emitting only in the infrared range is an OP 4461, also from Optek. A suitable phototransistor is a BPX43-V from Temic/Telefunken, Germany, for example.

Returning to FIG. 2, a light source, such as an LED 66a, and a photodetector, such as a phototransistor 66b, are preferably located at the rear of the printed circuit board 54 in the upper housing 44. Light emitted from the LED 66a passes through a window 68 in the rear of the upper housing 44, to light reflecting surfaces, such as a prism 218, in the bottom of the magazine 201. When no bill is present, the prism 218 reflects a certain amount of light back through the window 68 to the phototransistor 66b. When a bill is present between the LED 66a or phototransistor 66b, and prism 218, more light will be detected. When an acceptable bill being advanced to a position for stacking clears the light path, the intensity of detected light will decrease. The stacking portion 150 and magazine portion 200 of the bill validator 10 are arranged such that when the trailing edge of the bill clears the light path, the bill is in position for stacking. The processing and control circuit, such as the microprocessor 300, which monitors the phototransistor 66b, will detect the change in light intensity and turn on the stacking motor 178, shown in FIGS. 14–16. The bill will then be inserted into the magazine, as described below. A suitable LED 66a is a CQX-48 from Telefunken Electronics GmbH, Germany, for example. A suitable phototransistor 66b is a BPW-78, also from Telefunken, for example.

Figure 9:
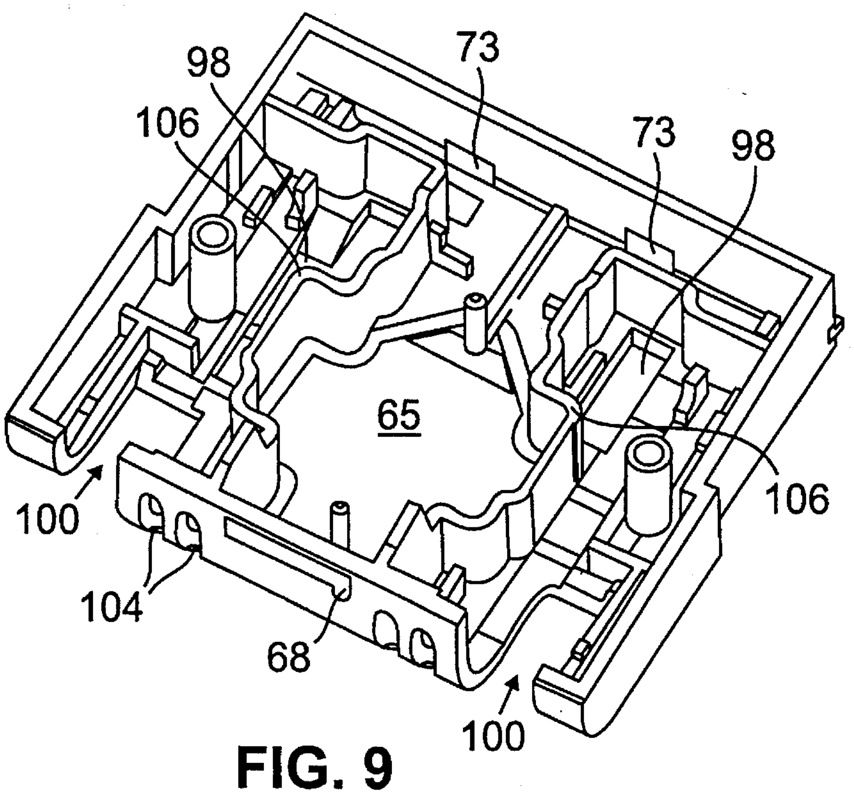
FIG. 9 is a top perspective view of the upper housing of FIG. 4.
Figure 10:
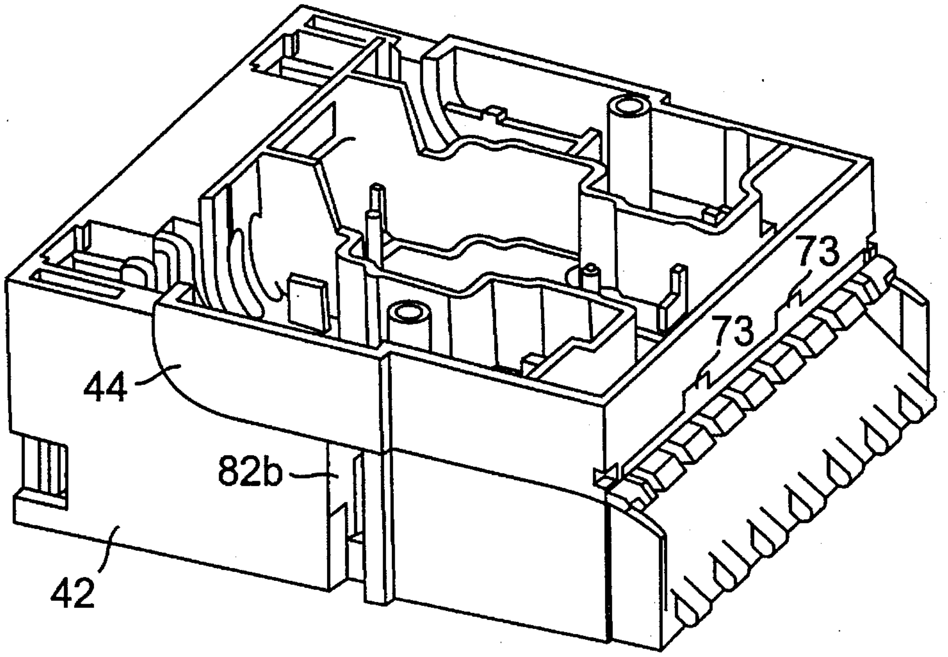
FIG. 10 is a top perspective view of the lower and upper housings of FIGS. 3 and 4 mating with each other.

An additional pair of LED's 71 can also be provided proximate the bill entry 46 to illuminate the bill entry or provide instructions, such as arrows, pointing toward the bill entry. Windows 73 are provided to enable light from these LED's to exit the housing. See also FIG. 9. The windows 73 can extend across the front of the upper housing 44, as shown in FIGS. 9–10.

Figure 5:
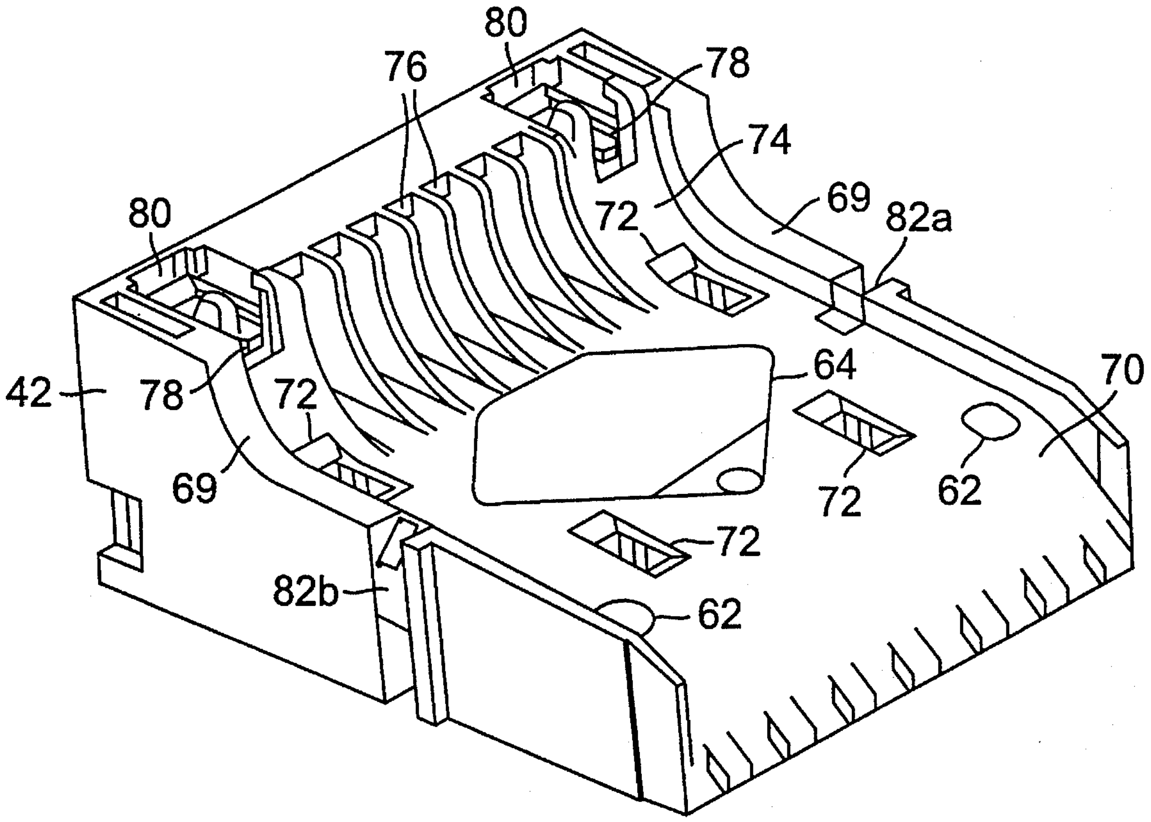
FIG. 5 is a top perspective view of the lower housing of FIG. 3.
Figure 6:
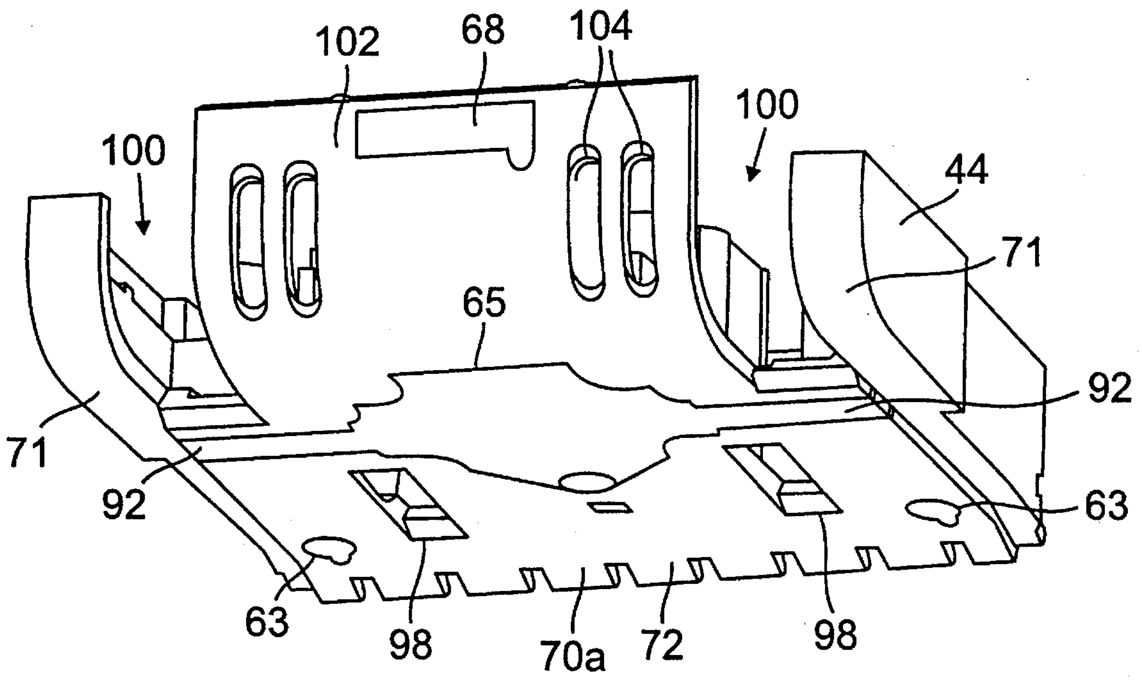
FIG. 6 is a bottom perspective view of the upper housing of FIG. 4.

FIG. 5 is a top perspective view of a preferred lower housing 42 and FIG. 6 is a bottom perspective view of a preferred upper housing 44, in accordance with the present invention. Surfaces 69 in the lower housing 42 mate with surfaces 71 in the upper housing. Surface 70 in the lower housing 42 and surface 70a in the upper housing 44 define in part the bill path 16 through the validator. The windows 62 and 64 are shown in FIG. 5 and the corresponding windows 63 and 65 are shown in FIG. 6.

The lower housing 42 further comprises pairs of openings 72 for receiving the pairs of spring loaded rollers 30 and 32. At the rear of the lower housing 42 is a curved wall 74 which directs a bill upward to a position for stacking. The wall 74 preferably includes channels 76 which pass through the rear of the lower housing 42, to enable drainage of liquid or passage of dirt. See FIG. 18.

At the top of the rear wall is another pair of openings 78 for another pair of spring loaded rollers 34, as shown in FIG. 1. The springs (not shown) are positioned within the columns 80 behind the openings 78.

Figure 7A:
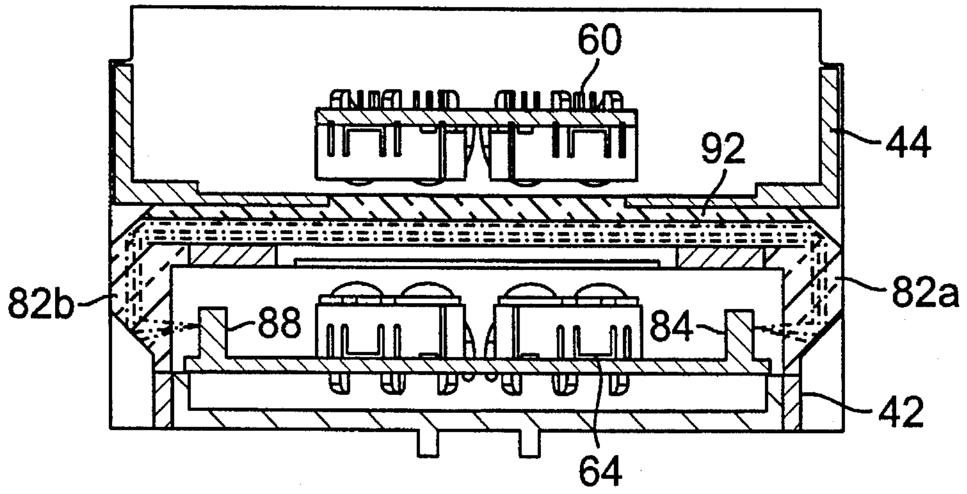
FIG. 7*a* is a cross sectional view of FIG. 2 through line 7.

First and second prisms 82a and 82b are also preferably provided in the lower housing 42, as shown in FIG. 5, to detect string, tape or other foreign objects attached to the bill. The first prism 82a reflects light emitted by a light source, such as an LED 84 (shown in FIG. 2), across the bill path in a direction essentially perpendicular to the direction of travel of a bill. The light is received by the second prism 82b, which reflects the light toward a photodetector, such as a phototransistor 88, as shown in FIG. 7a. The CQX-48 LED and BPW-78 phototransistor from Telefunken can be used. The prisms 82a, 82b are preferably located at a portion of the bill path which is unobstructed by rollers or belts so that there is a clear light path between the prisms 82a, 82b.

FIG. 7a is a cross-sectional view of the validation portion 12 through line 7—7 in FIG. 2, showing the LED 84, prisms 82a, 82b, and phototransistor 88. The validation LED's 58 and corresponding phototransistors 60 are also shown. The phototransistor 88 is monitored by a signal processing and control circuit, such as the microprocessor 300 of FIG. 24. After the trailing edge of the bill has passed the validation LED's 58, an expected level of light should be detected. That level of light could be the level of light detected when the leading edge of the bill first obstructs the start sensors, prior to entering the region between the first and second prisms 82a and 82b, for example. String, tape, or some other foreign object connected to the bill, can obstruct a portion of the light, decreasing the level of detected light, or reflect the light, increasing the level of detected light. If the actual detected light level is sufficiently different than that expected, such as a difference of approximately 3%, then a foreign object may be attached to the bill. No credit will then be accumulated and the bill will be returned. Preferably, the advance of the bill is stopped for 1–2 seconds while the signals from the validation phototransistors 60 and the string detector phototransistor 88, are evaluated.

Figure 7B:
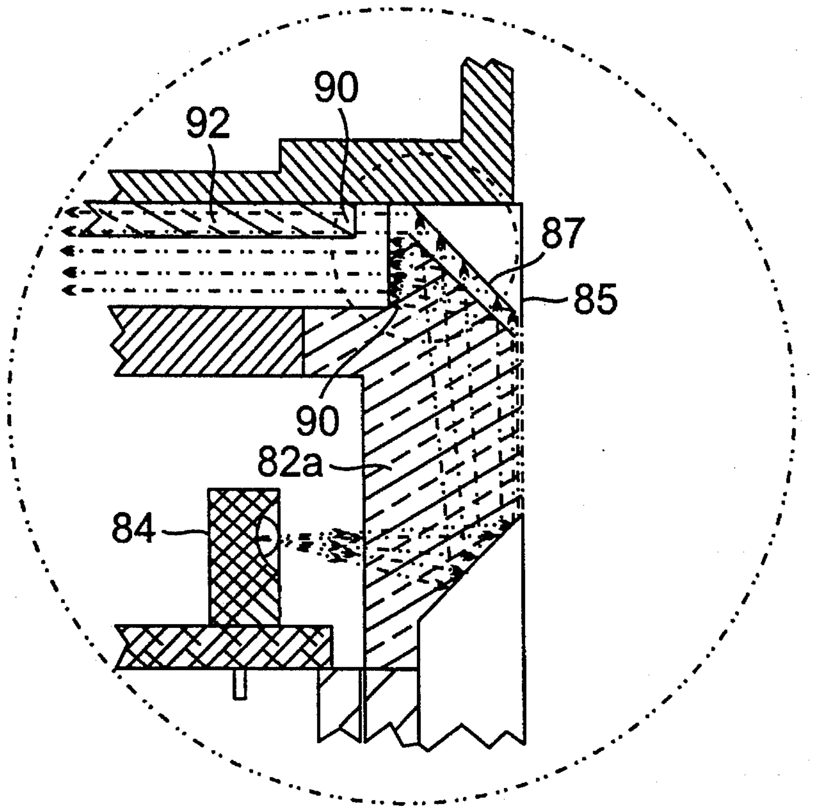
FIG. 7*b* is an enlarged view of the right side of FIG. 7*a;*

FIG. 7*b* is an enlarged view of the right side of FIG. 7*a*. In order to fully illuminate the bill path, the lower edge 85 of the upper reflecting surface 87 is preferably below the surface 70 of the lower housing 42.

The prisms 82*a*, 82*b* can be attached to the housing or molded to it, as described below. The prisms 82*a*, 82*b* could also be attached to the upper housing 44. Mirrors can be used instead of prisms, if desired.

Preferably, a gutter 90 is provided at the inside surface of the interface between the lower housing 42 and upper housing 44, as best shown in FIG. 7*b*. It has been found that when the side walls of lower and upper housings meet within the region of the bill path, a bill can get caught between the two surfaces. The gutters 90 displace the interface between the housings from the bill path.

Figure 7C:
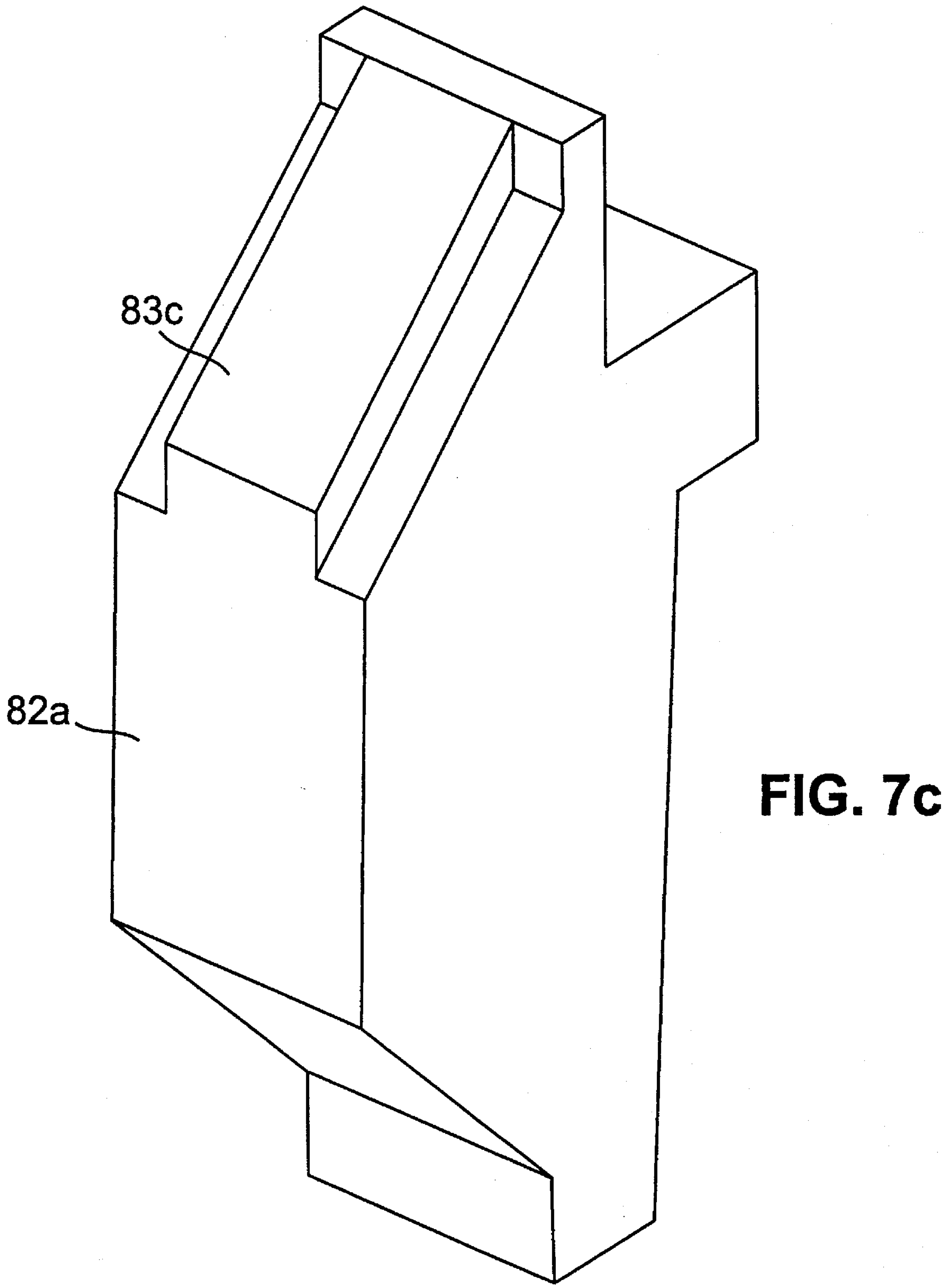
FIG. 7*c* is a top perspective view of a preferred prism.

The gutter 90 is defined in part by a light guide 92 of clear plastic material extending across the bottom surface of the upper housing 44. The light guide 92 can include the window 65, as shown in FIG. 6. The light guide 92 ensures that the gutters 90 can be checked for the presence of string, as well. FIG. 7*c* is a perspective view of a prism 82*a* removed from the lower housing 42. A raised central region 82*c* is preferably provided at the surface reflecting the light across the bill path to illuminate the gutter 90 and the light guide 92. The prism 82*b* preferably includes such a raised central region as well, to fully collect light from the light guide 92 and gutter 90.

Figure 8:
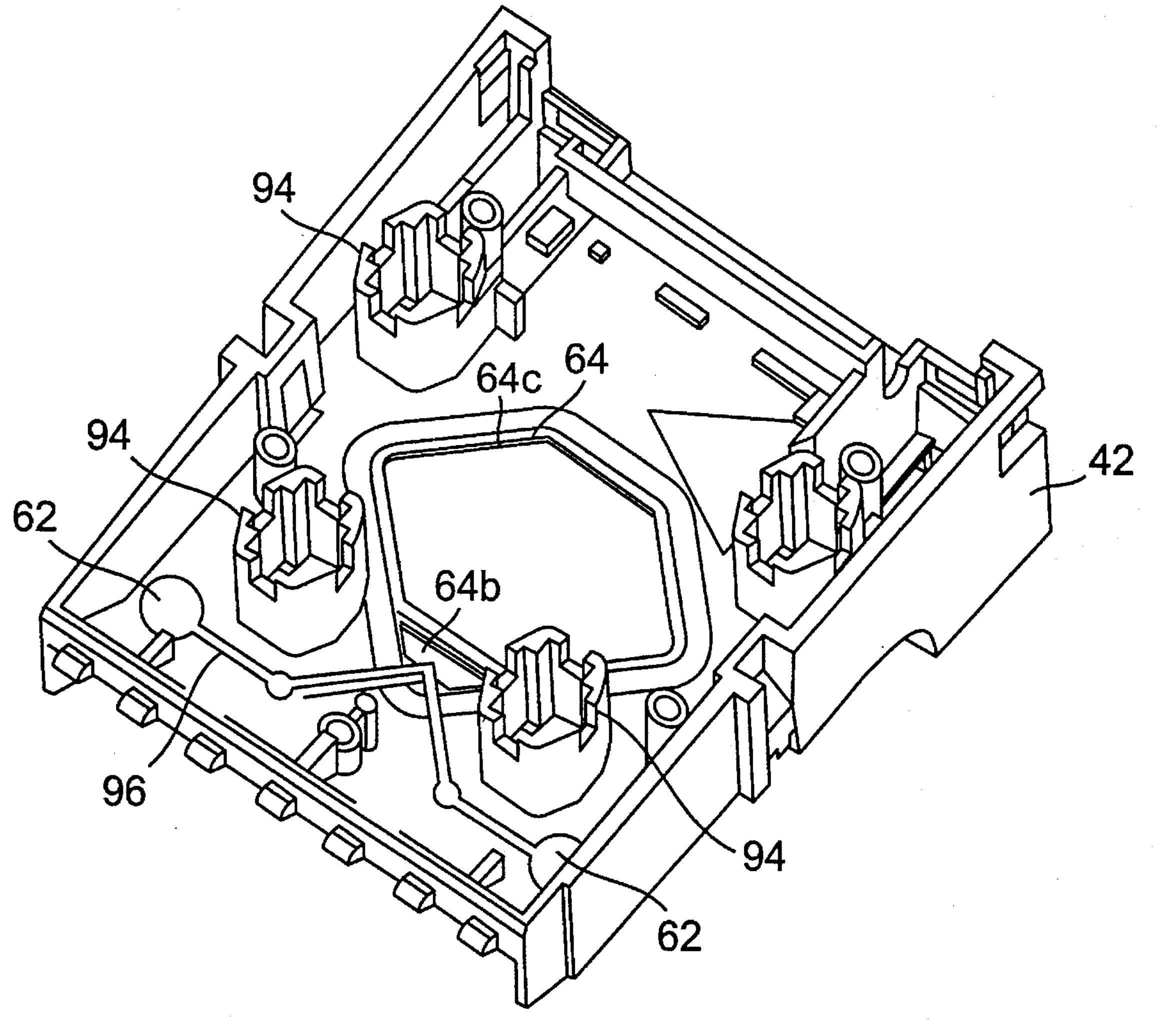
FIG. 8 is a bottom perspective view of the lower housing of FIG. 3.

FIG. 8 is a bottom view of the lower housing 42, showing the bottom portions of the items identified with respect to FIG. 5. The spring loaded rollers 30, 32 which protrude through the openings 72 shown in FIG. 5, are housed in columns 94. The window 64 and pair of windows 62 are preferably connected through a connecting wall 96 for ease of molding, as described below.

Returning to the bottom view of the upper housing 44 in FIG. 6, pairs of openings 98 are provided for receiving the second pair of driven rollers 24. Regions 100 are similarly provided for receiving the first pair of driven rollers 20. A curved rear wall 102 with grooves 104 is provided corresponding to the curved wall 74 of the lower housing 42. The grooves 104 allow for the drainage of liquid or dirt. At the top of the rear wall is the window 68, which can be used in conjunction with the LED/phototransistor pair 66*a*, 66*b*, to detect whether the bill is in position for stacking, as described above with respect to FIG. 2. In accordance with another aspect of the invention, the LED/phototransistor pair 66*a*, 66*b*, prism 218, and window 68 can be used to determine the status of the magazine 201, as described further, below.

FIG. 9 is a top perspective view of the upper housing 44. The windows 65, 68 and 73 are shown. Walls 106 are preferably provided between the portion encompassing the phototransistors 60 proximate the window 65, and the portion receiving the pairs of rollers 18 and 20, to protect the phototransistors 56, 60 from contamination by liquid or dirt. FIG. 10 is an upper front perspective view of the lower housing 42 mated with the upper housing 44, as they would be when assembled within the bill validator 10.

The windows 62, 63, 64, 65, 68, 73 are preferably clear to enable the use of any desired wavelength of light to examine a bill. The windows 62, 63, 64, 65, 68, 73 are preferably of one plastic material and the housing is of another plastic material. The two plastic materials are fused together. The windows 62, 63, 64, 65, 68, 73 and prisms 82*a*, 82*b* are of a plastic material transparent to the wavelengths of light emitted by the associated light source. The plastic material of the housing is not transparent to the light emitted by the light sources, and is preferally opaque or black to absorb the most ambient light. Since the plastics are fused, the interface between the windows and the remainder of the housing are water and air tight. The use of two or more different types of plastic also enables the main portion of the housing to be of a stronger plastic material, such as a reinforced plastic material, than the transparent portion may be. Some of the components, such as the prisms 82*a*, 82*b*, could be separately molded and attached to the housing, as well. The windows can be molded to a metal housing, such as a housing of die cast zinc alloy, as well. Mechanical interlocking, such as a tongue and groove arrangement, would be required to secure the molded plastic to the metal.

The housings can be formed by a two-shot or over mold molding process. As is known in the art, in a two-shot or over mold molding process, a first portion of the desired end product is formed in a first tool or mold. That first portion is then placed in a second mold where the walls of the second mold and the first portion define the contours of the second molded portion. If the material used in the second molding process is compatible with the material of the first molded portion, the second material will fuse with the first, providing an integral part with nearly the strength as a part molded in one step of one material. The two shot molding process avoids the need to attach separately molded pieces through a snap-in fit, for example, or other modes of attachment such as screws, adhesive or heat staking. The parts fit together with greater strength and precision than if other modes of attachment are used. When used to form validation housings, the transition between the first and second molded parts is smooth, with essentially no raised edges which can collect dirt or obstruct the passage of a bill. The interface between the fused materials is also strong. Injection molding is the preferred molding technique.

Injection molding and injection molds are described, for example, in *Modern Plastics Encyclopedia,* October 1986, Volume 63, Number 10A, pages 252–265, 340–346. Suitable two shot molded parts can be provided by Accede Mold and Tool Co., Inc., Rochester, N.Y., and Dual Machine Tool Co., Inc., West Berlin, N.J., for example.

In the preferred embodiment, the opaque or black portions of the housings are formed first, in first tools or molds. The housing material can be LEXAN® 500, a glass fiber reinforced polycarbonate resin available from GE Plastics, Pittsfield, Mass., for example. Important characteristics of the LEXAN® 500 appear below:

| PROPERTY | ENG(S1) UNITS | TEST METHOD | LEXAN 500 10% Glass Reinforced resin |
|---|---|---|---|
| Water absorption equilibrium, 73F. (23C.) | % | ASTM D 570 | 0.31 |
| Mold Shrinkage, flow, 0.125" (3.2 mm) | in/in E-3 | ASTM D 955 | 2–4 |
| Flexural Strength | psi(MPa) | ASTM D 790 | 15,000(100) |

-continued

| PROPERTY | ENG(S1) UNITS | TEST METHOD | LEXAN 500 10% Glass Reinforced resin |
|---|---|---|---|
| 0.125" (3.2 mm) | | | |
| Flexural Modulus 0.125" (3.2 mm) | psi(MPa) | ASTM D 790 | 500,000 |
| Taber Abrasion, CS-17, 1 kg | mg/1000cy | ASTM D 1044 | 11 |
| Izod Impact, notched, 0.125" (3.2 mm), 73F. (23C.) | ft-lb/in(J/m) | ASTM D 256 | 2.0(106) |
| Izod Impact, unnotched, 0.125" (3.2 mm), 73F. (23C.) | ft-lb/in(J/m) | ASTM D 256 | 40(2,100) |
| HDT, 264 psi (1.82 MPa), 0.250" (6.4 mm) | deg F.(deg C.) | ASTM D 648 | 288(142) |
| UL 94V-O Flame Class Rating | in (mm) | UL 94 | 0.058(1.47) |

The first molded parts are then placed in appropriate second molds to form the windows. LEXAN® 141, a clear plastic polycarbonate resin also available from GE Plastics, for example, can be used. Important characteristics of LEXAN® 141 appear below:

| PROPERTY | ENG(S1) UNITS | TEST METHOD | LEXAN 141 resin |
|---|---|---|---|
| Melt/Flow Rate, nom'l 300C. 1.2 kgf(0) | g/10 min | ASTM D 1238 | 12.5 |
| Mold Shrinkage, flow, 0.125" (3.2 mm) | in/in E-3 | ASTM D 955 | 5–7 |
| Flexural Strength, 0.125" (3.2 mm) | psi(MPa) | ASTM D 790 | 14,000(97) |
| Flexural Modulus, 0.125" (3.2 mm) | psi(MPa) | ASTM D 790 | 342,000(2,300) |
| Taber Abrasion, CS-17, 1 kg | mg/1000cy | ASTM D 1044 | 10 |
| Izod Impact, notched 0.125", (3.2 mm), 73F.(23C.) | ft-lb/in(J/m) | ASTM D 256 | 14(748) |
| HDT, 264 psi (1.82 MPa), 0.250" (6.4 mm), unannealed | deg F.(deg C.) | ASTM D 648 | 270(134) |
| Light Transmission | % | ASTM D 1003 | 89 |
| Haze | % | ASTM D 1003 | 1.0 |
| Refractive Index | — | ASTM D 542 | 1.586 |
| 100 Series UL94V-2 Flame Class Rating | in (mm) | UL 94 | 0.045(1.14) |

Figure 11:
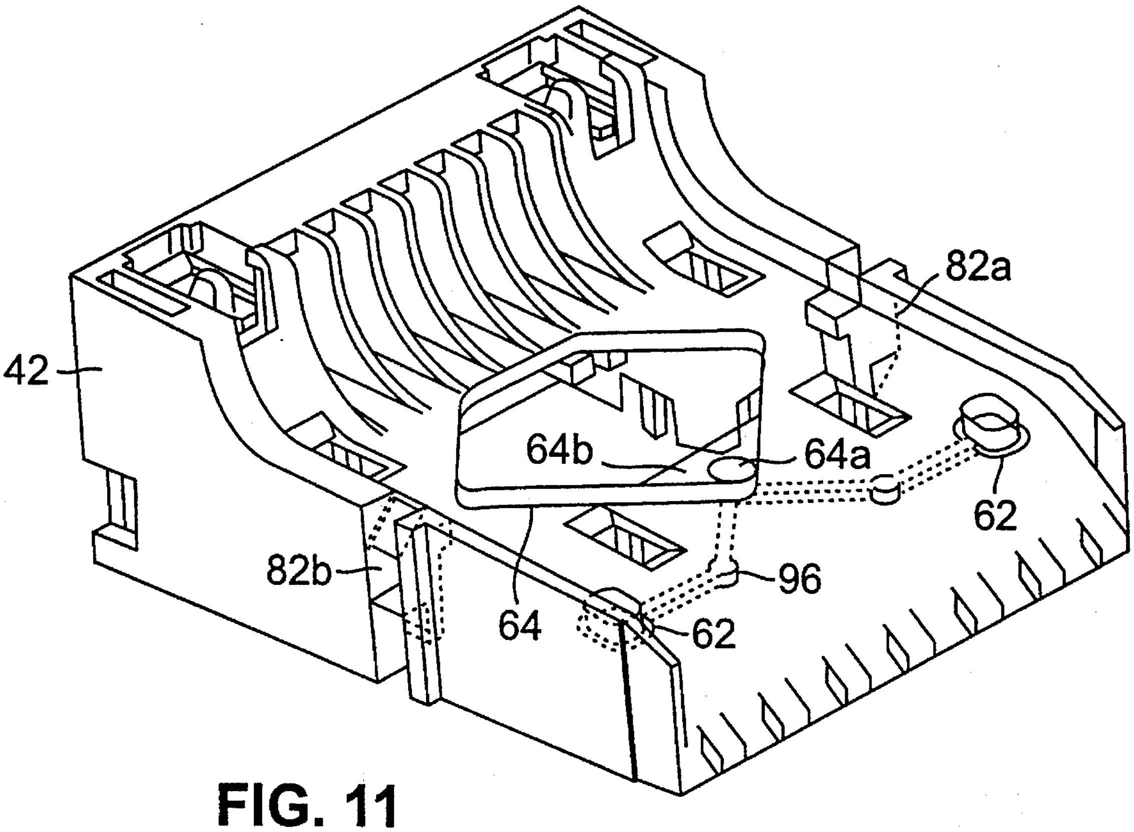
FIG. 11 is a top perspective view of the lower housing of FIG. 3 with the transparent portion shown in phantom.

As described above, the first molded portions and the molds define the regions to be filled by the second molding material. FIG. 11 is a perspective view of the lower housing 42, wherein the first portion of the housing molded in the first step is shown in solid lines and the second portions of the housing preferably molded in the second step, the windows 62, 64 and the prisms 82*a*, 82*b*, are shown in phantom. As mentioned above, the windows 62, 64 are preferably connected by the wall 96 so that only one injection point or gate is required in the mold to inject plastic to form that part. Separate gates are required for each prism 82*a*, 82*b*.

Figure 12B:
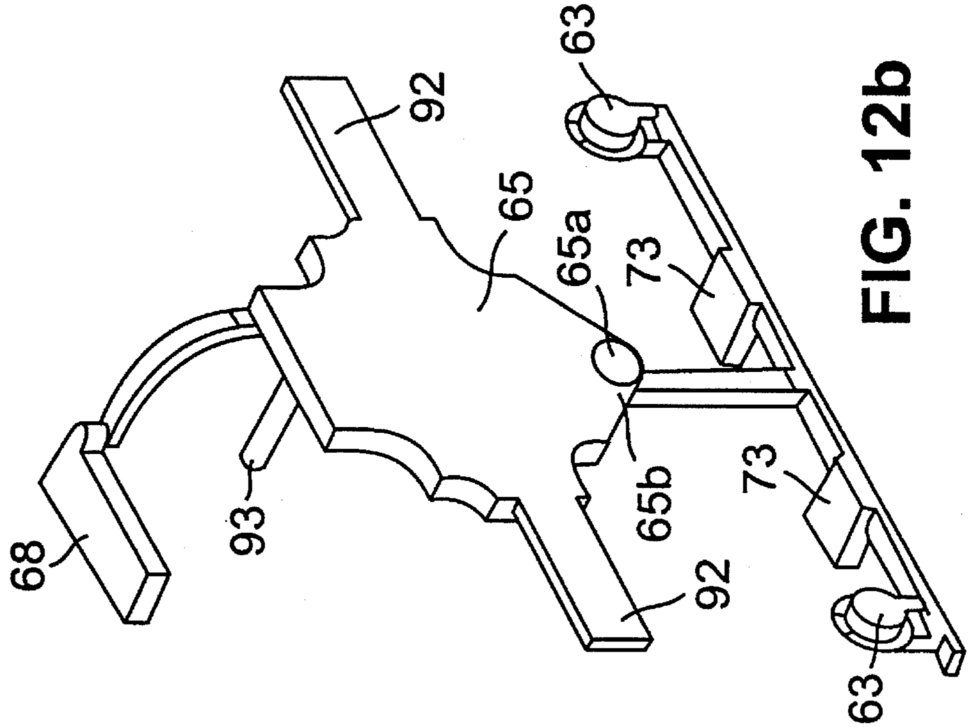
FIG. 12*b* is a front perspective view of the window portion of the upper housing removed from FIG. 12*a;*
Figure 12A:
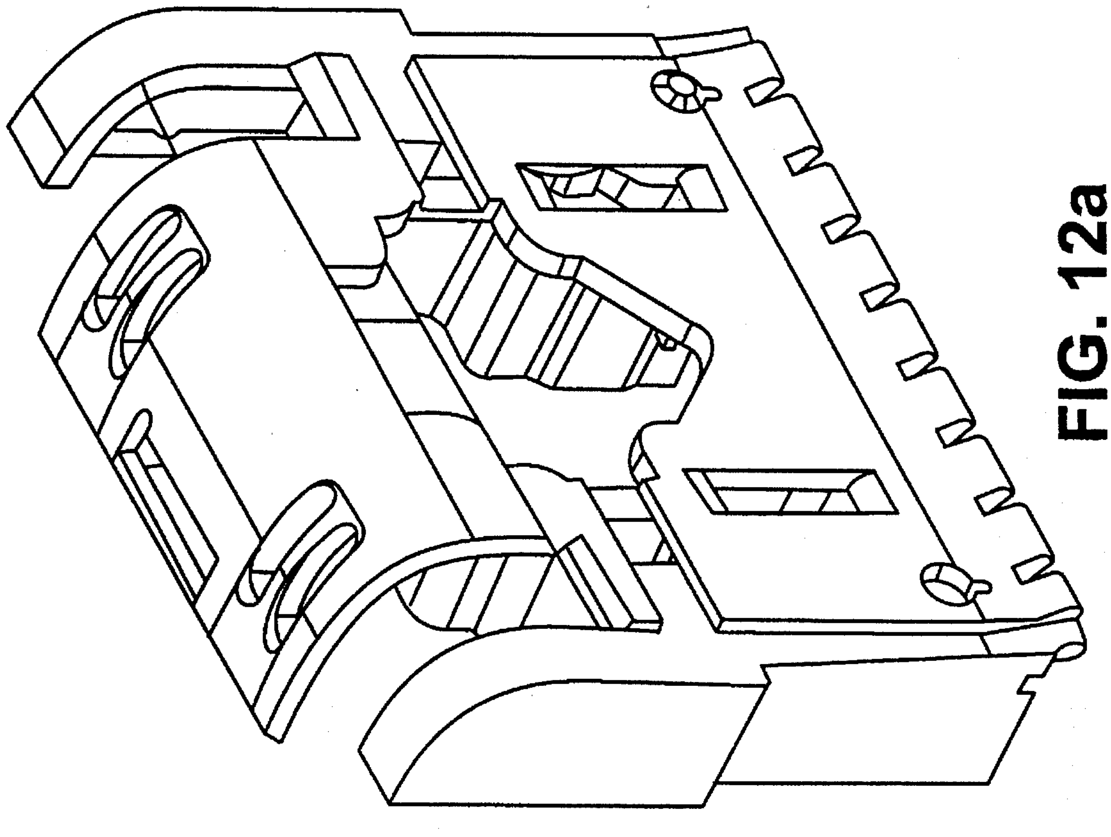
FIG. 12*a* is a perspective view of the upper housing of FIG. 4 with the windows removed.
Figure 12D:
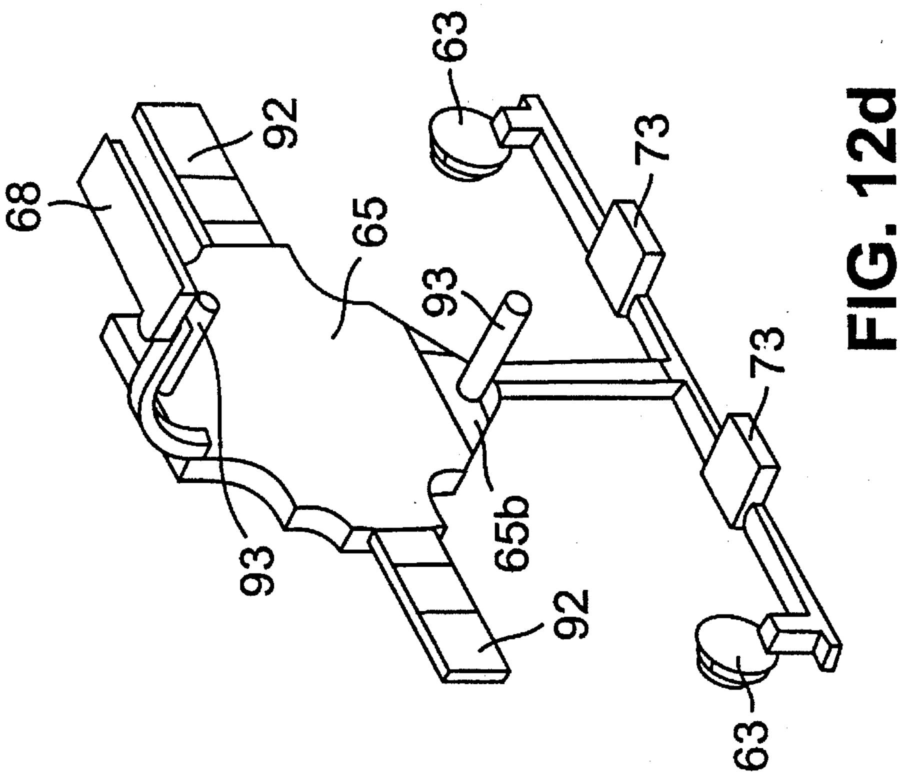
FIG. 12*d* is a rear perspective view of the window portion of the upper housing removed from FIG. 12*c;*
Figure 12C:
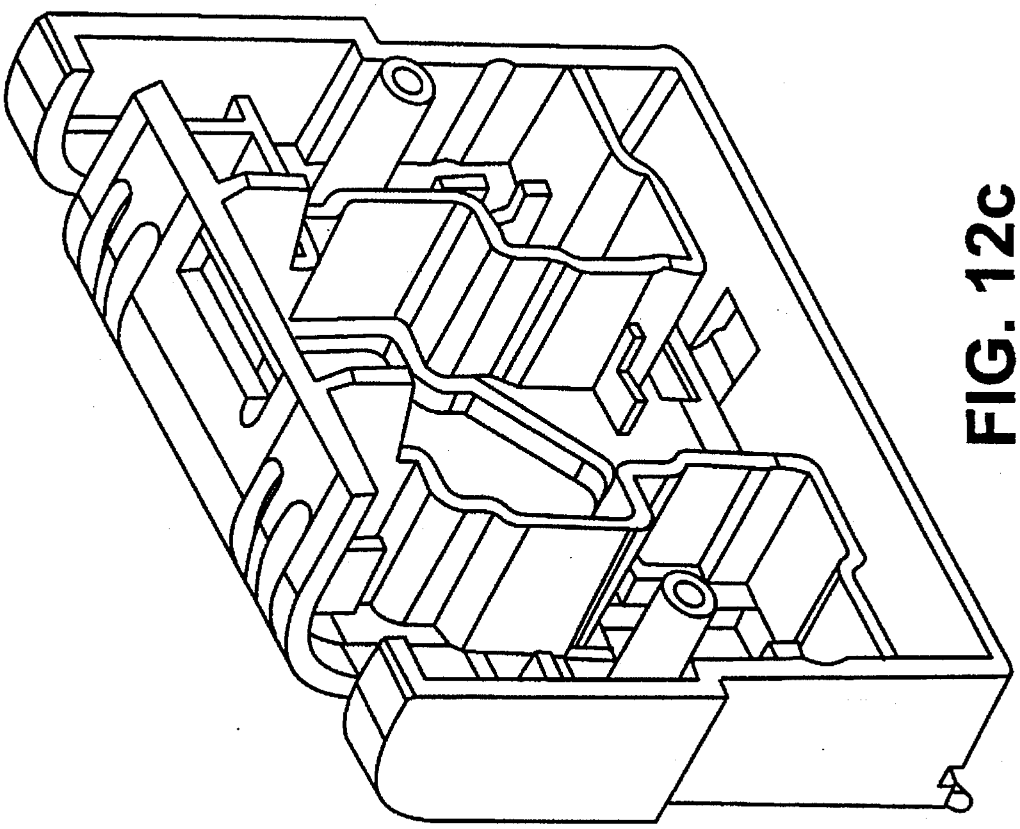
FIG. 12*c* is a bottom perspective view of the upper housing of FIG. 4 with the windows removed.

FIGS. 12*a* and 12*b* are bottom views of the part of the upper housing 44 formed in the first molding process and the part formed in the second molding process, respectively. The entire second molded part comprising the windows 63, 65, 68 and 73, and the light guides 92, are preferably connected so that they can be formed in one piece, through one injection gate. FIGS. 12*c* and 12*d* are views of the opposite sides of parts of FIGS. 12*a* and 12*b*, respectively. Plastic posts 93 are preferably provided for mounting the printed circuit board 54.

Suitable molds for each part of the lower and upper housing 42, 44 can be made by those skilled in the art, based on the views of the housings FIGS. 11–12. Of course, housings of different configurations to accommodate different locations for windows or openings to receive rollers, for example, can be made in accordance with the present invention, as well.

The first and second parts of the lower housing 42 can be molded in a Van Dorn Injection Molding Machine, Model No. 120-RS-8F-HT, set at a clamping pressure of about 100–120 tons, for example, available from Van Dorn Demag Corporation, Strongsville, Ohio. To form the first portion of the lower housing 42, about 53.9 grams of the LEXAN® 500 resin are melted in a barrel at about 590° F. The resin is injected by the machine into the mold at about 1676 pounds per square inch (psi), initially at a rate of about 4.50 inches per second, which decreases to about 4.00 and then 3.5 inches per second as the mold fills. The mold is preferably cooled by water at about 50°–60° F. After the mold is filled, it is held at about 1,000 psi for about 5 seconds. After curing for about 35 seconds, the first molded portion is ejected.

The first part is then placed in the second mold for injection of the clear, LEXAN® 141. The second mold is preferably cooled by water at about 200° F. About 3.8 grams of the LEXAN® 141 are melted at about 550° F. The resin is injected into the mold at a pressure of about 1494 psi, initially at a rate of about 0.25 inches per second, which decreases to about 0.10 inch per second as the mold fills. After the mold is filled, it is held at about 500 psi for about 5.5 seconds. After curing for about 17 seconds, it is ejected from the mold.

Preferably, the second shot resin LEXAN® 141, is injected into a well in the mold comprising a ramp which reduces the cross section of the well. The injected material fills the well and then fills the remainder of the second shot mold through the region of reduced cross-section. The use of such a well reduces the turbulence of the resin as it is being injected into the mold, as is known in the art. Turbulence can distort the window interfering with the passage of light. Such distortions need to be minimized, particularly for the windows between the validation LED's 58 and phototransistors 60. The preferred injection point 64*a* and well 64*b* for the second shot plastic in the lower housing 42 is shown are shown in FIG. 11.

Figure 11A:
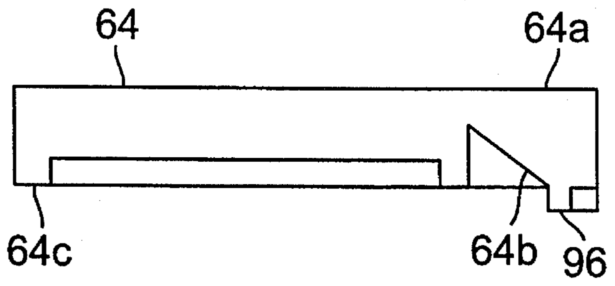
FIG. 11*a* is a cross sectional view of the window 64 of FIG. 11.

FIG. 11*a* is a partial cross-sectional view of the window 64 of FIG. 11, from the injection point 64*a* to the rear of the window. The ramp in the mold forms a corresponding ramp 64*b* in the window 64. The thickness of the central portion of the window 64 is about 0.060 inches (1.5 mm). The thickness of the window 64 at the base of the ramp 64*b* is about 0.040 inches (1.0 mm). The outer edge 64*c* of the window 64 is about 0.100 inches (2.5 mm), which corresponds to the thickness of the first molded part of the lower housing 42. The thickness of the edge 69*c* is preferably the same as the thickness of the first molded part so that there is a sufficient surface area for the plastics of the first and second molded parts to fuse. The edge 64*c* is also shown in FIG. 8.

The window 65 in the upper housing 44 has a similar ramp 65*b* proximate the preferred injection point 65*a*. See FIGS. 12*b*, 12*d*. Because of the size of the window 65, there is no room for an edge of greater thickness than the remainder of the window. Therefore, the entire window is about 0.100 inches (2.5 mm) thick.

The upper housing 44 can be molded in a Van Dorn Injection Molding Machine, Model No. 230-RS-20F-HT, set at a clamping pressure of about 100–120 tons. The model referred to above could be used as well. To form the first molded part of the upper housing 44, 24.7 grams of LEXAN® 500 are melted at about 580° F. The resin is injected into the mold at a pressure of about 1786 psi, at an initial rate of 3.50 inches per second, which is decreased to 2.5 inches per second as the mold fills. The temperature of the water cooling the mold is preferably about 100° F. After the mold is filled, it is held at about 1,000 psi for about 4.0 seconds. After curing for about 28 seconds, it is ejected from the mold.

The first part is then inserted into a second mold, cooled at about 200° F. 3.7 grams of LEXAN® 141 are melted at 550° F. and injected at a pressure of 1517 psi at an initial rate of about 0.2 inches per second, increasing to about 0.8 inches per second as the mold fills. The slow initial velocity avoids distortion at the injection point. After the mold is filled, it is held at about 1,000 psi for about 4.0 seconds. After curing for about 20 seconds, the part is ejected from the mold.

Clamping pressure of about 100–120 tons has been found to be necessary when either injection molding machine is used, to prevent leakage of the second shot material and maintain a smooth transition between the parts. In addition, the diameter of the three flow channels into the second shot mold for the lower housing (one for the window 64 and one for each of the prisms 82*a*, 82*b*), are adjusted so that the different portions of the mold fill uniformly, as is known in the art. The rate of flow can also be adjusted for uniform fills.

As mentioned above, the transparent plastic material can be molded to a metal part, such as a die cast zinc alloy, as well. The die cast part would be inserted into the second mold and the mold and part would define the contours of the molded part. The mold would include mechanical interlocking regions, such as tongues and grooves at the interface of the plastic and metal parts, to secure the plastic to the metal, as is known in the art.

Turning to a preferred stacking mechanism, FIG. 13 is a perspective view of the transport and stacking portion 150. The upper housing 44 of the validation portion 12 is removed to reveal obstructed components. The pair of driving rollers 18, the pair of first driven rollers 20, the pair of second driven rollers 24, the coupling belts 22 and 26 and the tension roller 28, all discussed above, are shown. The tension roller 28 is supported by an arm 28*a*. A pusher plate 152 is provided to push a bill into the magazine, as described further, below. Portions of the scissor arms 154, 156 which advance and retract the pusher plate 152, are also shown.

Figure 14:
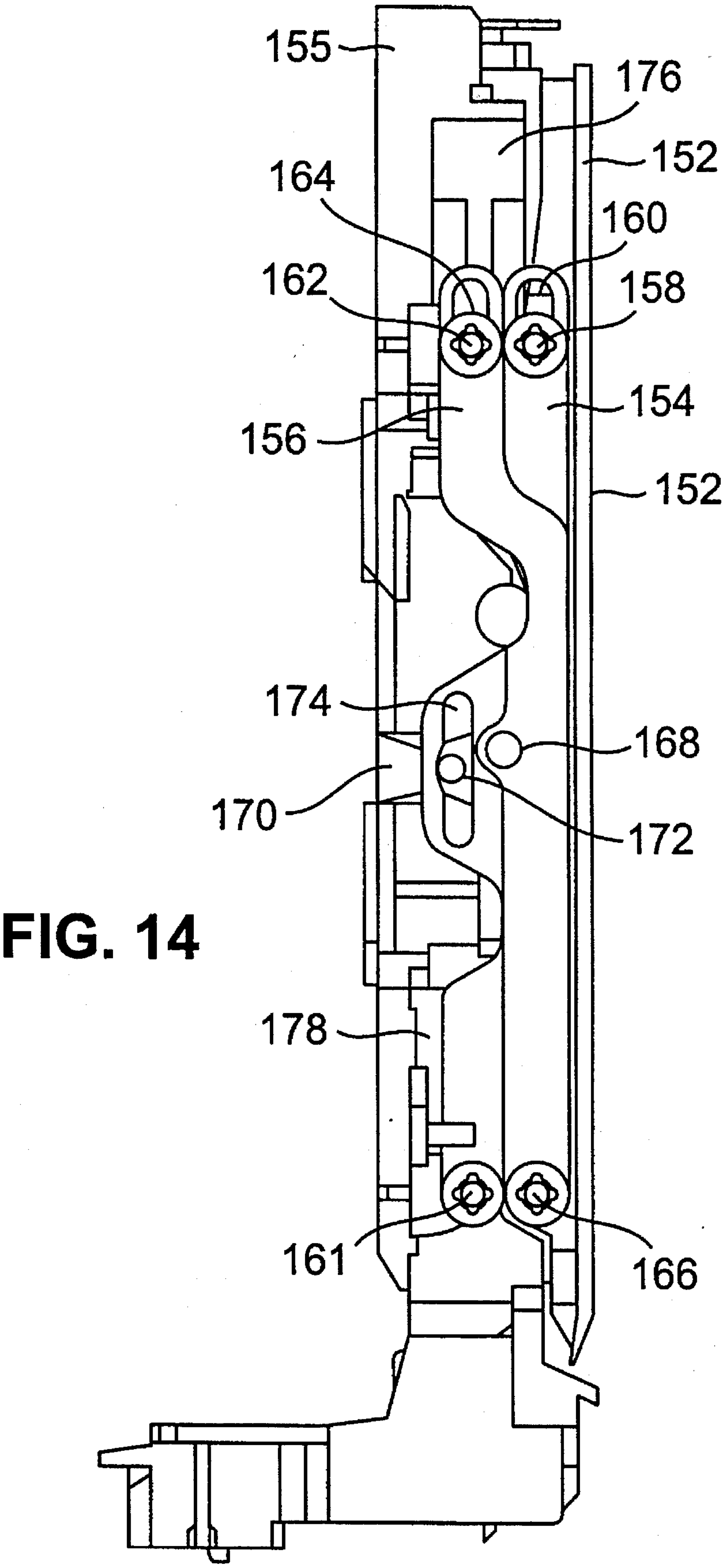
FIG. 14 is a side view of the transport and stacking portion shown in FIG. 13.

FIG. 14 is a side view of the transport and stacking portion 150 of FIG. 13, with the rollers and belts removed to more clearly show the stacking mechanism. The pusher plate 152 is shown in its retracted, home position. A first end of the first scissor arm 154 is preferably coupled to the pusher plate 152 by a pin 158 within an elongated slot 160. The other end of the first scissor arm 154 is coupled to the gear box housing 155 by a pin 161. A first end of the second scissor arm 156 is coupled to the gear box housing 155 by a pin 162 within an elongated slot 164. A second end of the scissor arm 156 is coupled to the pusher plate 152 by a pin 166. The scissor arms are coupled to each other by a pin 168, such as a shoulder rivet. The pusher plate 152, the gear box housing 155 and the pins 158, 161, 162 and 166 are preferably molded plastic.

An eccentric drive wheel 170 drives the scissor arms 154, 156. A pin 172 on the eccentric drive wheel 170 is preferably secured within a slot 174 in the first scissor arm 154. The eccentric drive wheel 170 is driven by a motor 178 through coupling gears (not shown). A corresponding pair of scissor arms (not shown) is provided coupled to the opposite side of the housing 155 and pusher plate 152. Another eccentric drive wheel (also not shown) is similarly provided to drive that pair of scissor arms.

Figure 15:
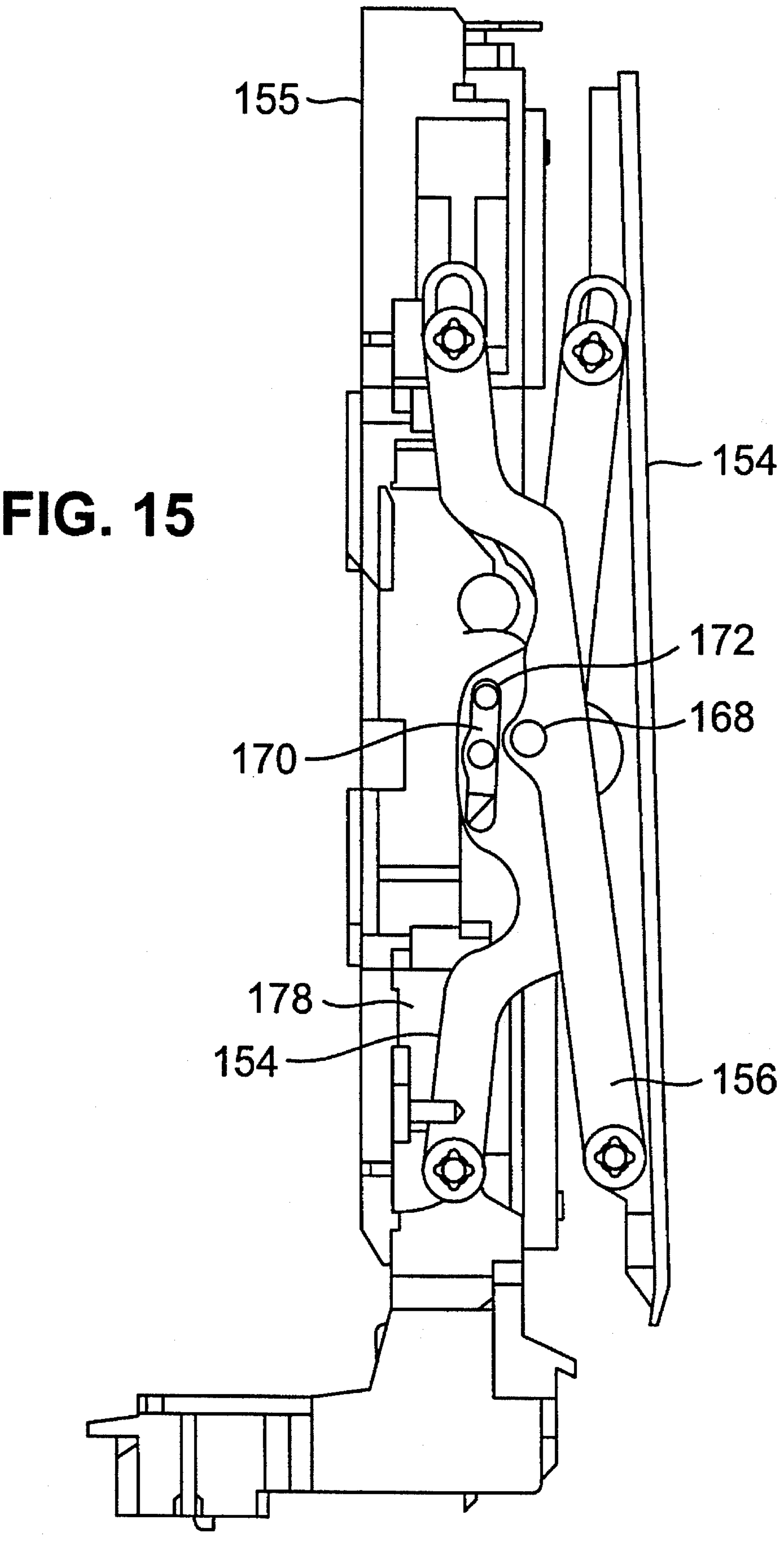
FIG. 15 is a side view of the transport and stacking portion shown in of FIG. 13, with the pusher plate being advanced.
Figure 16:
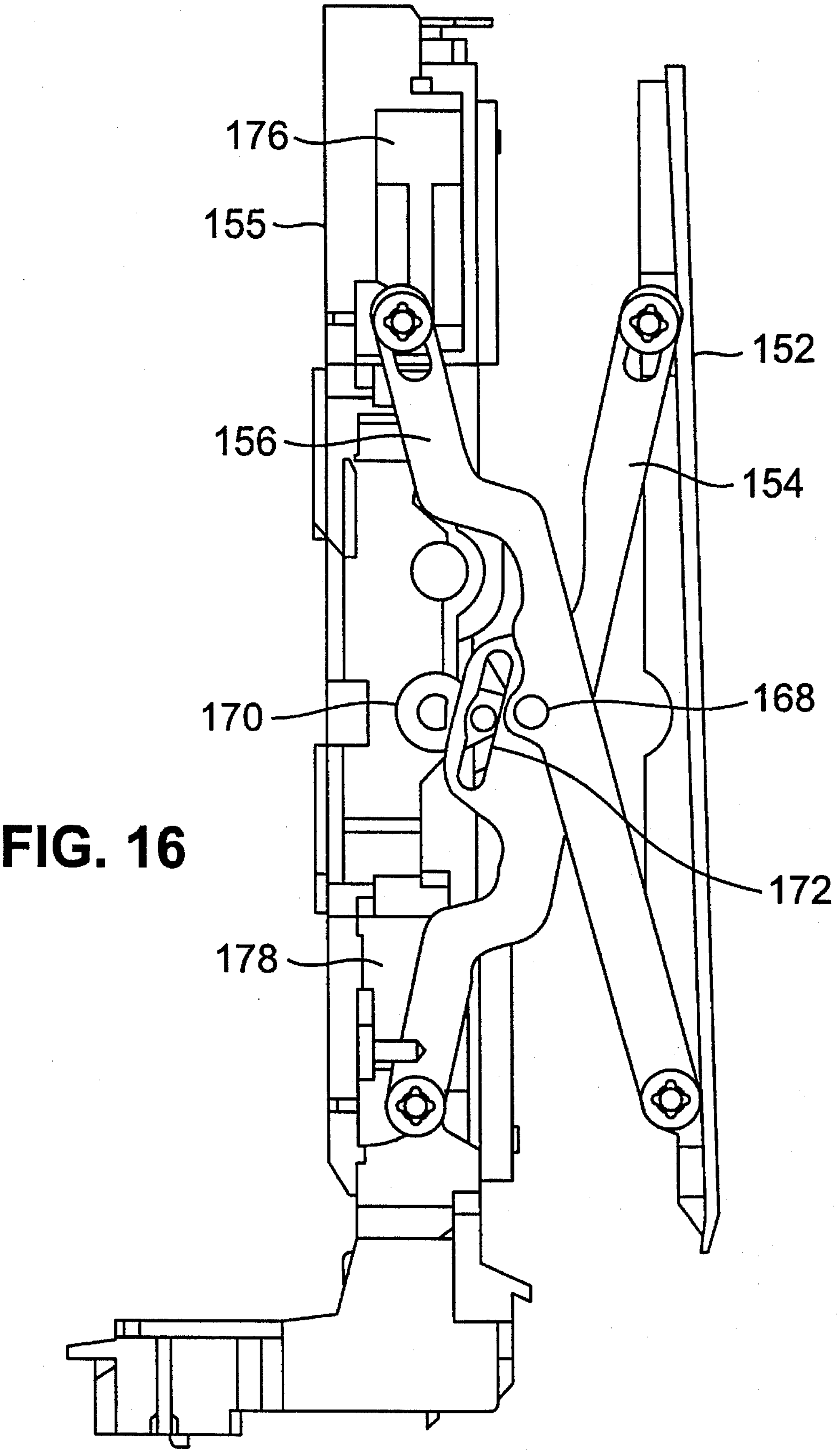
FIG. 16 is a side view of the transport and stacking portion of FIG. 13, with the pusher plate fully advanced.

When a bill is in position for stacking, the eccentric drive wheel 170 rotates. The pin 172 coupling the wheel 170 to the first scissor arm 154 drives the first scissor arm 154 forward, which in turn drives the second scissor arm 156 forward through the pin 168, as shown in FIG. 15. FIG. 16 shows the scissor arms 154, 156 and pusher plate 152, fully extended. The configuration of the eccentric wheel 170 is more clearly shown in FIG. 16, as well.

After fully extending the scissor arms 154, 156, and stacking the bill, the eccentric wheel 170 continues to rotate, returning the scissor arms 154, 156, and hence the pusher plate 152, to its home position of FIGS. 13–14, to await another bill. By directly coupling the eccentric drive wheel 170 to the second scissor arm 154, through a pin in a slot arrangement, positive control of the scissor arms 154, 156 and pusher plate 152 is maintained over their entire range of motion. Other stacking mechanisms may be used, as well.

When the magazine is full, the bill validator is put out of service. The criteria for placing the bill validator 10 out of service can vary. For example, if the magazine 201 is full, the scissor arms cannot fully extend to insert the bill. The increased current drawn by the motor 178 as it attempts to drive the scissor arms forward can be detected by the control and processing circuit, such as the microprocessor 300. The microprocessor 300 can then cause the direction of the motor to reverse, withdrawing the pusher plate 152. An optical sensor (not shown) can also be provided proximate the rear portion 170*a* of the eccentric wheel 170, to detect whether the wheel 170 has returned to its home position of FIG. 14. The bill validator 10 could then be put out of service if the wheel 170 has not returned to its home position within an expected time period, indicating a stall, a jam or a full magazine. Other sensor arrangements for monitoring the position of the eccentric wheel can be used, as well. Optionally, additional attempts to stack the bill can be made prior to going out of service.

Figure 17:
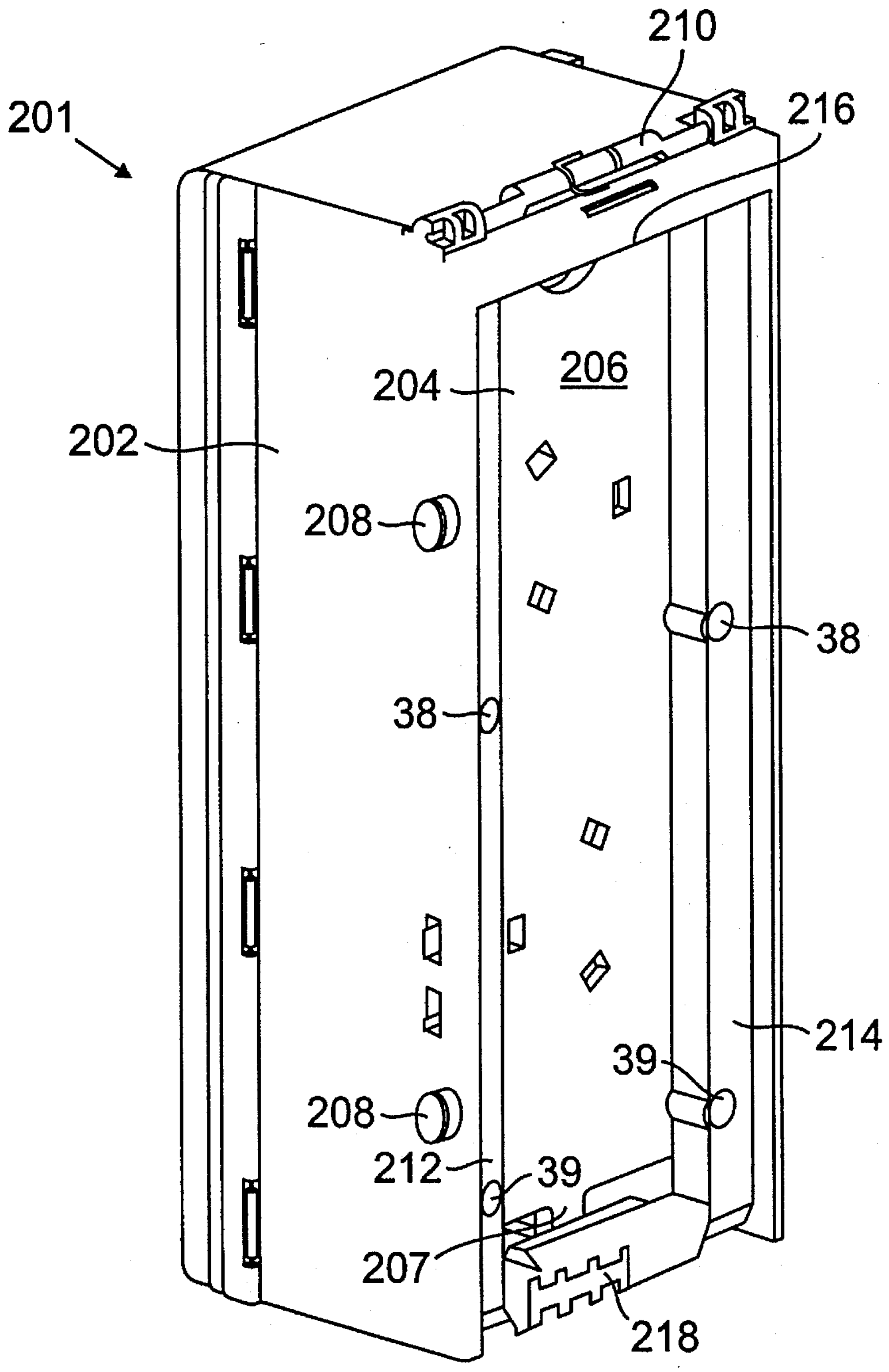
FIG. 17 is a perspective view of an empty bill magazine in accordance with the present invention.
Figure 18:
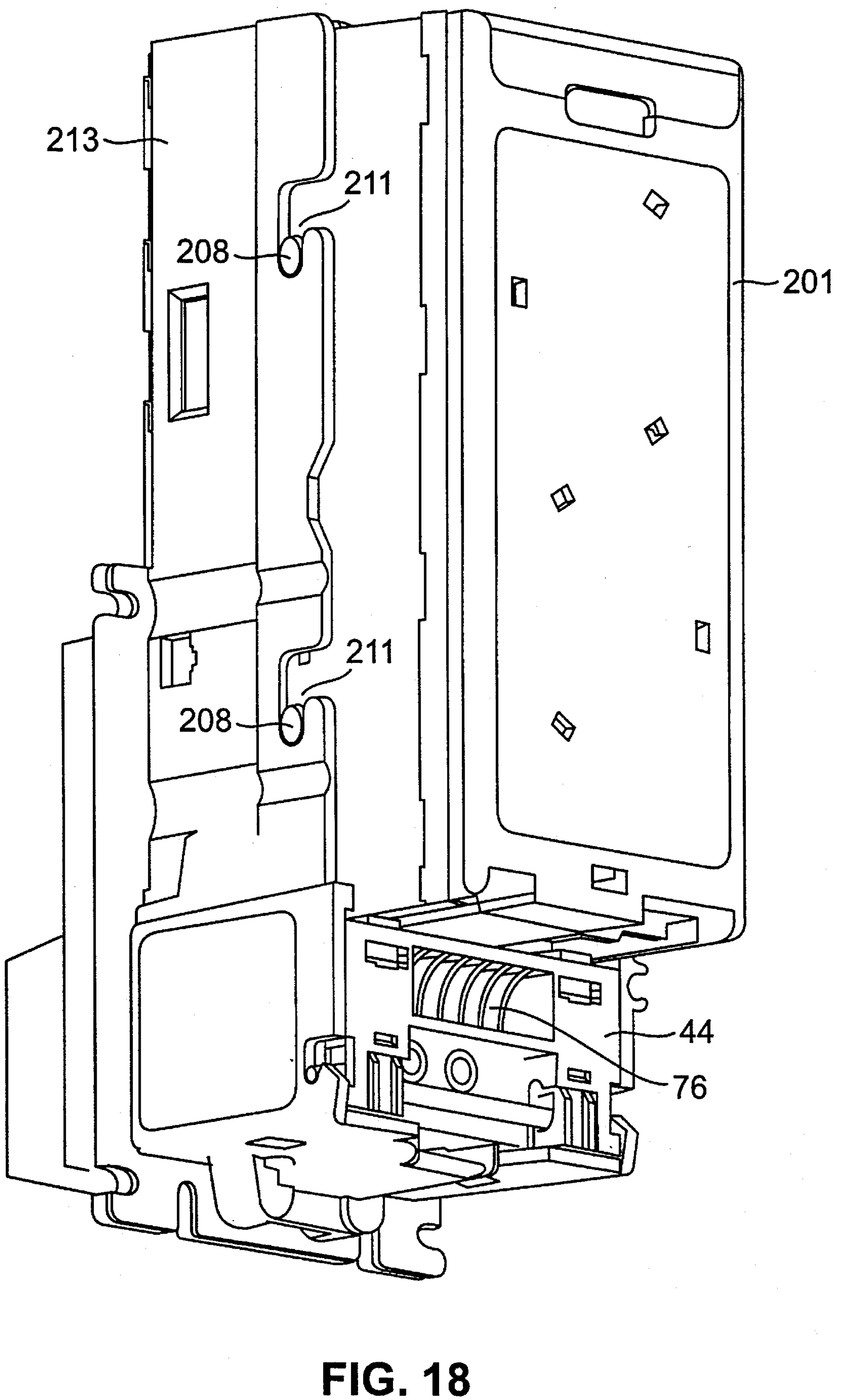
FIG. 18 is a rear perspective view of the bill validator of FIG. 17.
Figure 19:
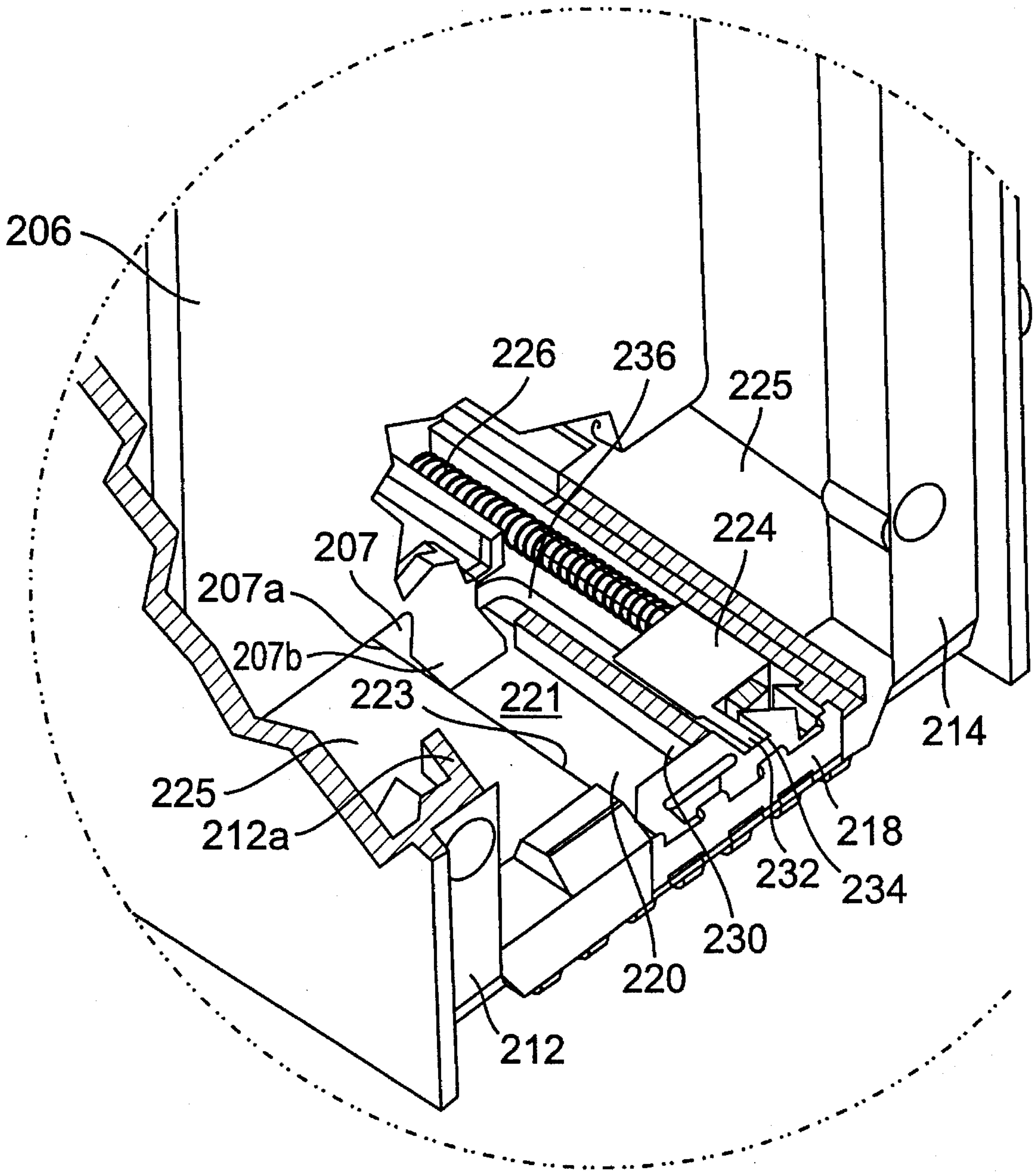
FIG. 19 is a partially cutaway view of the lower portion of the magazine of FIG. 17.

Turning to the magazine portion 200 of the bill validator 10, FIG. 17 is a perspective view of an empty bill magazine 201 in accordance with the present invention. The magazine 201 comprises a frame 202 with an open front 204 and a pressure plate 206. A tab 207 protrudes from the bottom of the plate 206. The purpose of the tab is described with respect to FIGS. 19–20 below. Pins 208 can be provided for securing the magazine to slots in the chassis of the bill validator 10, as is shown in FIG. 18. A hinged door 210 is provided at the top of the magazine. The door could be located on the side of the magazine, as well. The front wall of the magazine adjacent the pressure plate 206 includes surfaces 212, 214 protruding from the frame 202, across the open front 204 of the magazine 200. These surfaces 212, 214, form a final portion of the bill path 16. An edge 216 protrudes across the open front from the top of the frame 202, at the end of the bill path 16. The distance between the side edges 212, 214 is less than the width of a bill to be stored. The pressure plate 206 preferably bears against essentially perpendicular extensions 212*a*, 214*a* from the edges 212, 214, respectively, as shown in FIG. 19, due to the pressure exerted by a pair of springs, such as the conical springs 209, shown in FIG. 1. Also shown in FIG. 17 are the pairs of passive rollers 38 and 39 discussed above with respect to FIG. 1. The extensions 212*a*, 214*a* provide room for the prism 218, as well as the rollers 38, 39. As discussed above, the prism 218 is preferably provided at the bottom of the magazine 201 to determine whether the bill is in position for stacking. In accordance with the present invention, the prism 218 is also used by the bill validator 10 to determine whether a service call has been made.

FIG. 18 is a rear perspective view of the bill validator 10. The pins 208 can be received in slots 211 in the validator chassis 213. A spring loaded latch (not shown) can secure the magazine 201 in place, as is known in the art. After the latch is released, the magazine can be lifted up and out of the slots 211.

FIG. 19 is an enlarged perspective view of the bottom of the magazine 201 of FIG. 17, with the bottom portion of the pressure plate 206 partially removed and spaced from the front edges to better reveal the inner workings of the magazine 201 in accordance with the present invention. The tab 207 extends through a groove 223 into a chamber 220. The tab 207 preferably includes horizontal protrusions 207*a*, 207*b*, proximate the groove 223, to minimize rotation of the pressure plate 206. The chamber 220 is defined in part by a bottom wall 221 and a top wall 225, partially removed from this view. FIG. 19 also shows the prism 218 which has a recess 234.

Figure 20:
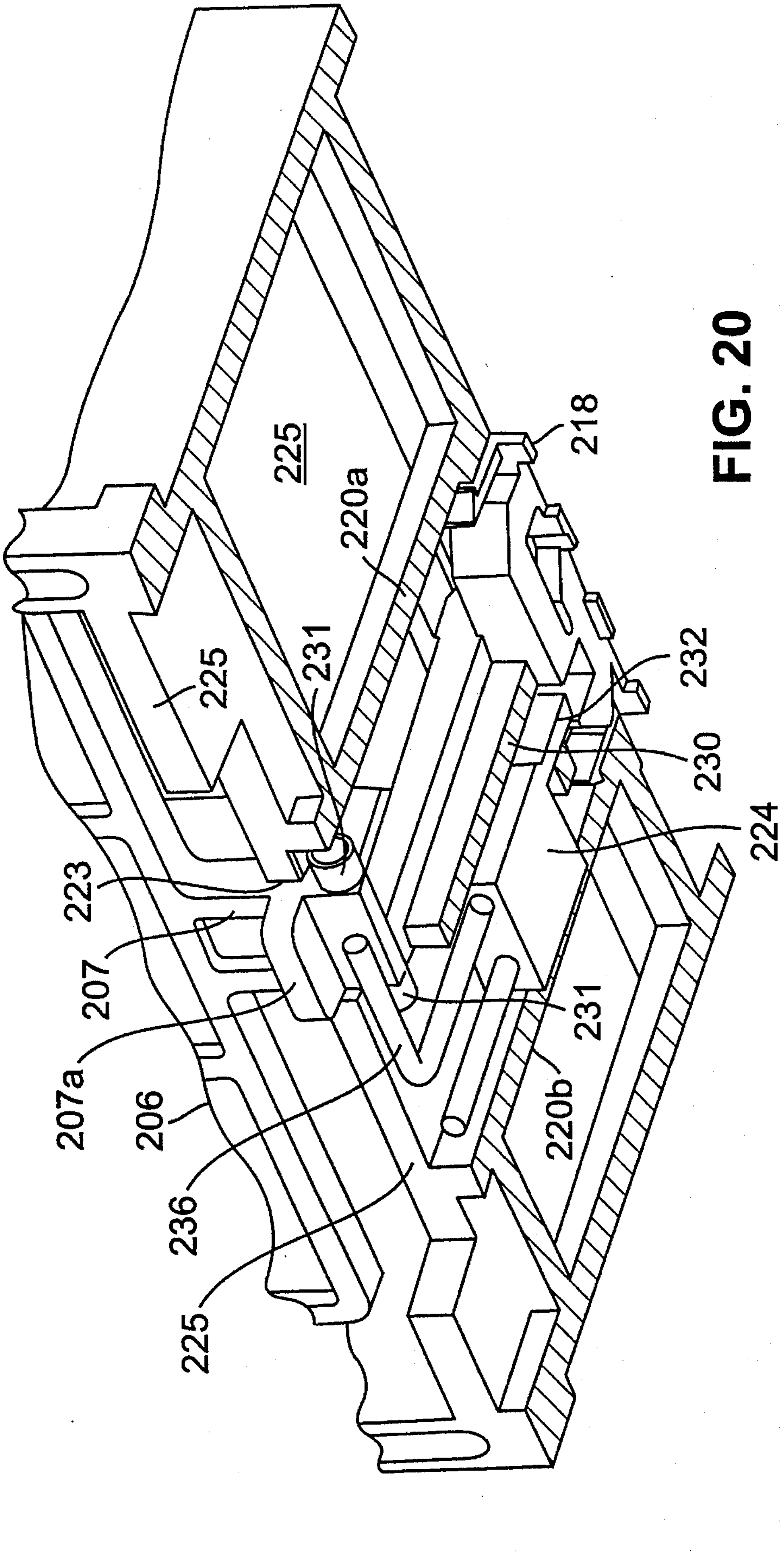
FIG. 20 is a bottom perspective cutaway view of the magazine of FIG. 17.

A blocker 224 attached to a spring 226 is also located within the chamber 220. The spring 226 biases the blocker towards the open front of the magazine 201. The portion of the top wall 225 covering the blocker 224 and removed from this view, extends to the tab 207 to define the other side of the groove 223. The blocker 224 has a first, L-shaped arm 236, which preferably protrudes from the rear of the blocker 224. A portion of the arm extends across the chamber 220 behind the tab 207, as shown in FIG. 20. A second arm 232, which can be received by the recess 234, also protrudes from the blocker 224. A wall 230 preferably separates the blocker 224 from the remainder of the chamber 221.

FIG. 20 is a partial, bottom perspective cross-sectional view of the lower region of the magazine 201, with the bottom wall 221 defining the bottom of the chamber 220, removed. Walls 220*a* and 220*b* define the sides of the chamber. The bottom surface of the top wall 225, and the groove 223 through which the tab 207 extends, are also shown, as is the horizontal portion 207*a* of the tab 207.

The tab 207 preferably includes circular extensions 231 which are received by the chamber 220 between the wall 220*c* and the bottom wall 221. The L-shaped arm 236 preferably extends across the path of the tab 207 within the chamber 220, beneath the protrusions 207*a*, 207*b*. The spring 226 is also removed from the blocker 224 in this view.

Figure 21:
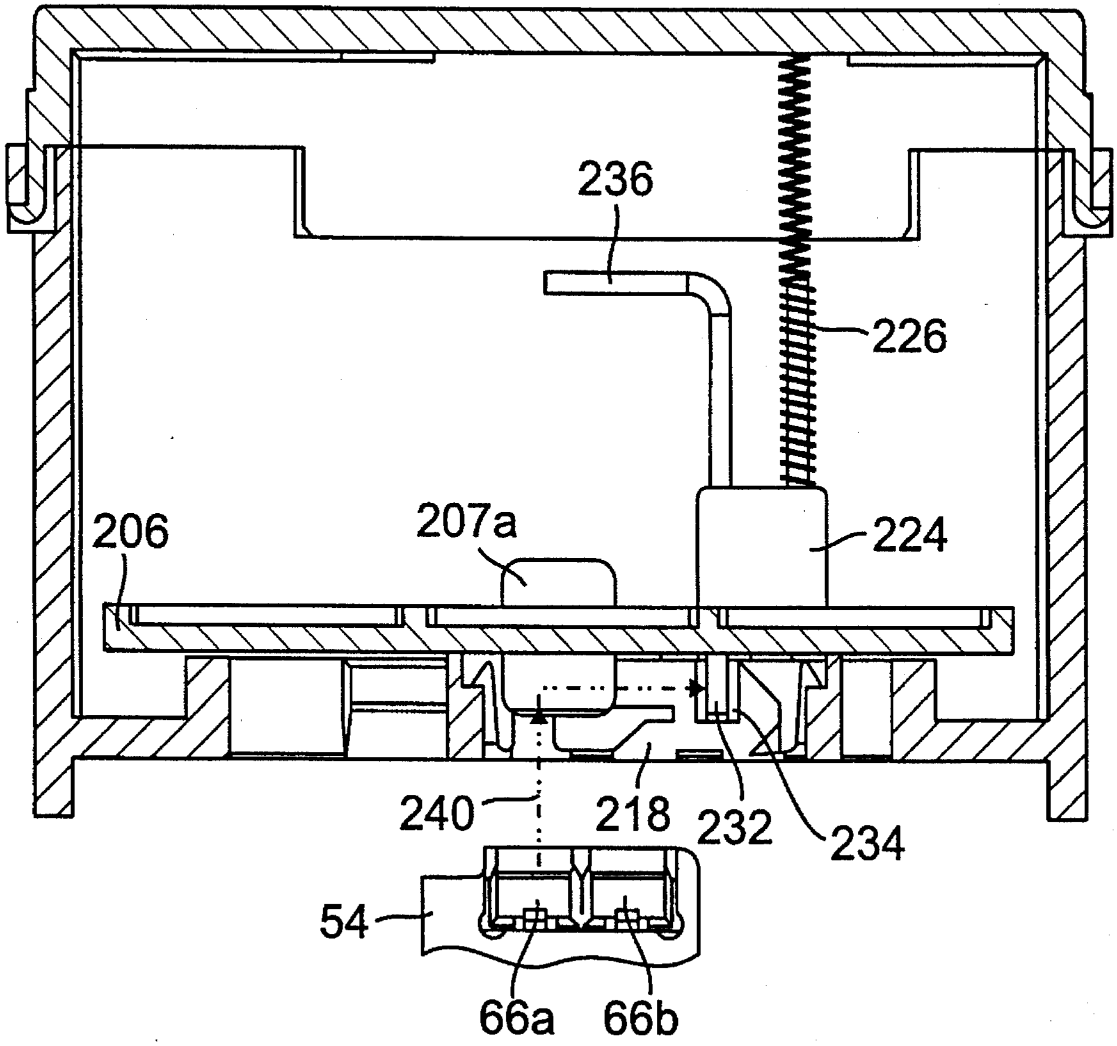
FIG. 21 is a top view of the magazine of FIG. 17, with portions removed.
Figure 22:
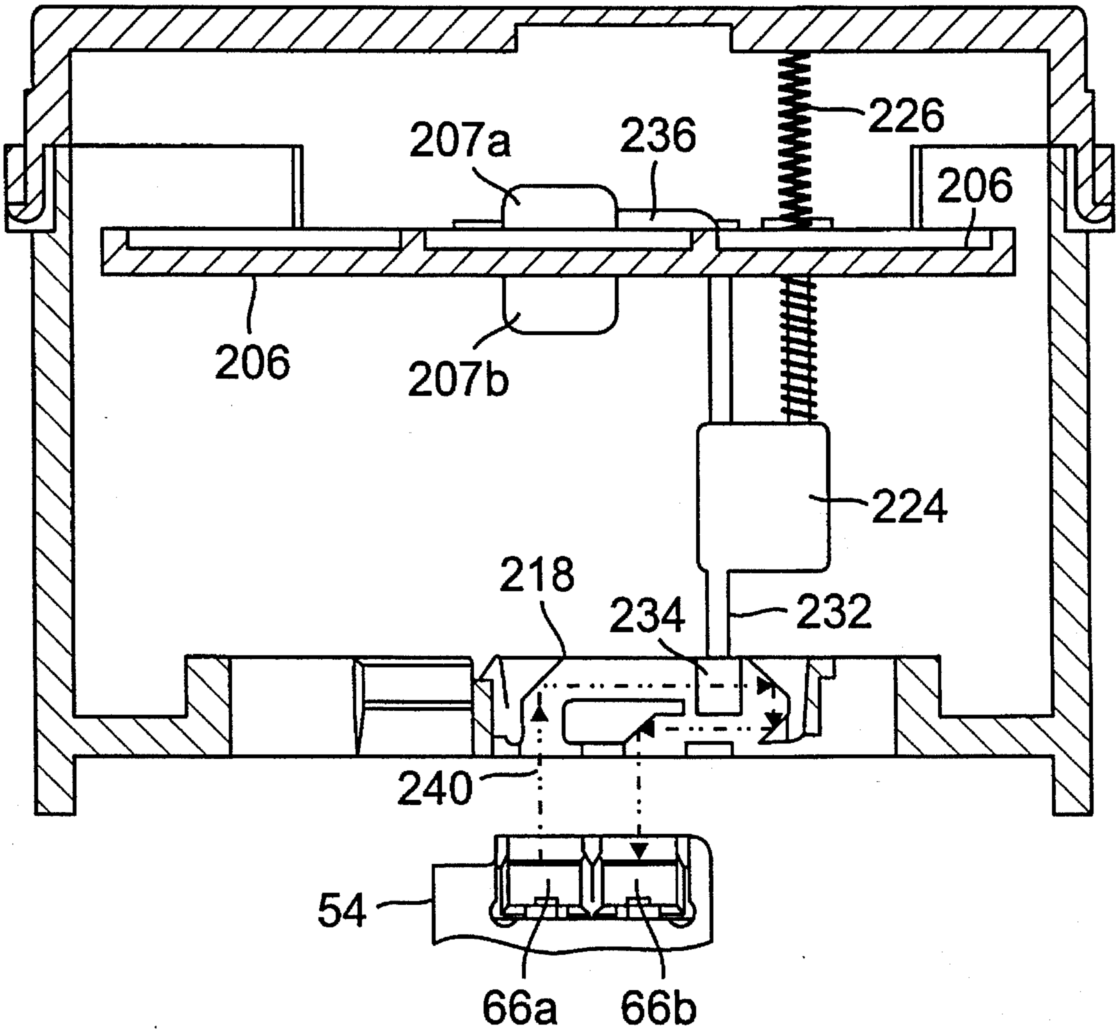
FIG. 22 is a top view of a partially filled magazine, with portions removed.

The operation of the magazine 201 in accordance with the present invention will be described with respect to FIGS. 21–22, which are simplified top views of the bottom portion of the magazine 201, with walls 220*a*, 220*b*, 230 and 225, removed. FIGS. 21–22 also show the LED/phototransistor pair 66*a*, 66*b*, described with respect to FIG. 2, above, which is preferably mounted on the printed circuit board 54 (shown in part). The window 68 between the LED/phototransistor pair 66*a*, 66*b* and the prism 218, is not shown in FIGS. 21–22. Arrow 240 indicates the path of light emitted by the LED 66*a*, which is blocked in part by the second arm 232 in FIG. 21.

As the magazine 200 fills with bills, the pressure plate 206 is pushed further into the magazine and the tab 207 recedes in the chamber 220. When the pressure plate 206 reaches the portion of the L-shaped arm 236 extending across the channel 220, the tab 207 engages the arm 236. As additional bills are inserted into the magazine 201, the tab 207 carries the arm 236, the blocker 224 and the second arm 232 towards the rear of the magazine 201. The second arm 232 is thereby removed from the recess 234 of the prism 218. While the number of bills that needs to be stacked to cause the second arm 232 to be removed from the recess 234 can vary based on the size and positions of the various components, such as the positioning of the L-shaped arm 236 and length of the second arm 232, it is preferred that the second arm will be removed when the magazine is almost full. For example, the second arm 232 can be removed from the recess 234 when there is room for only about an additional 25–35 bills to be inserted into the magazine 201. FIG. 22 is a top view of the bottom portion of the magazine 201 when it is essentially full. The second arm 232 is shown completely removed from the recess 234.

When the second arm 232 is in the recess 234, the passage of light through the prism 218 is blocked. Only about 20% of the light impinging upon the prism face 218*a* will then be detected by the phototransistor 66*b* due to reflection off the front face of the prism and some leakage through the prism. When the protrusion is removed, approximately 90% of the light impinging upon the prism face 218*a* can be detected by the phototransistor 66*b*. The particular percentages can vary based on the particular application, dimensions or types of components.

Figure 23A:
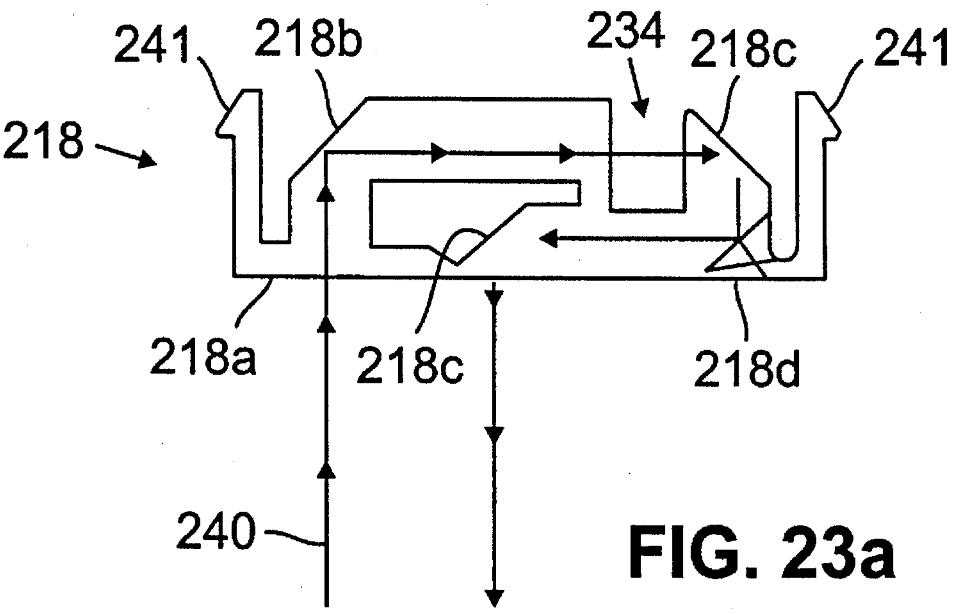
FIG. 23*a* is a top view of a prism used in the magazine.
Figure 23B:
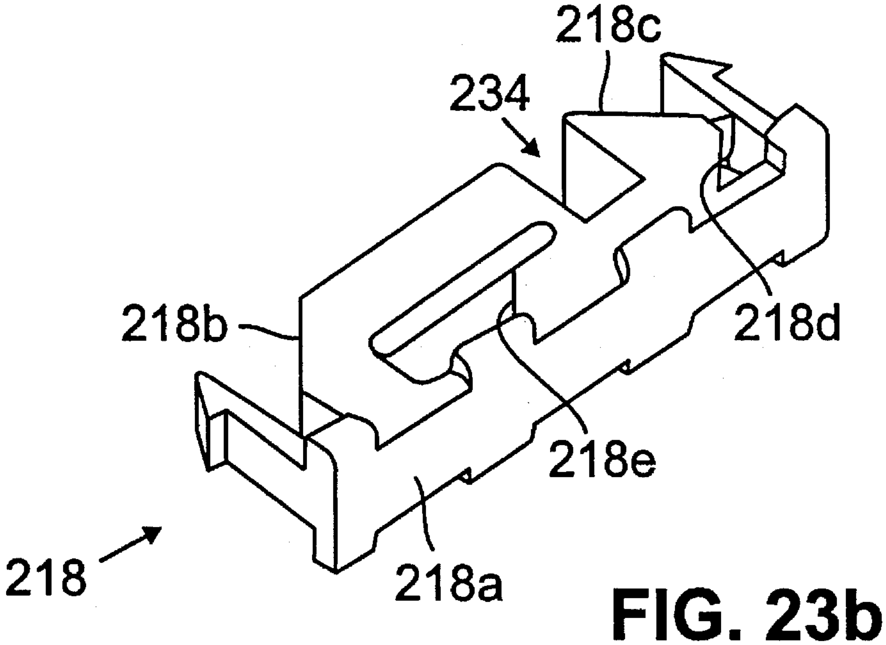
FIG. 23*b* is a perspective view of the magazine of FIG. 23*a; and*

FIG. 23*a* is a top view of a preferred embodiment of the prism 218 with faces 218*a*–218*e*. Arrow 240 indicates the path of light emitted by the LED 66*a*, through the prism 218. Light entering the prism 218 through the front surface 218*a* will be reflected off the face 218*b*, across the recess 234 in a first direction, off surface 218*c* to face 218*d*, which reflects the light to surface 218*e* in a second direction opposite the first direction. Surface 218*c* reflects the light out of the prism 218 through front face 218*a*, as shown. Surfaces 218*d* and 218*e* are provided to direct the light out of the prism at a location adjacent and proximate the point of entry of the light, so that the LED 66*a* and phototransistor 66*b* can be close together or connected. This provides for a more compact structure. The light could be directed out of the prism 218 from surface 218*c*, if desired, as long as the phototransistor 66*b* is suitably positioned to receive the light. FIG. 23*b* is a perspective view of the prism 218. Tabs 241 are preferably provided to snap the prism 218 into position within the magazine 201. The prism can be made of LEXAN® 141, for example. Suitable prisms can be provided by Modern Plastics Technics, West Berlin, N.J. Instead of a prism, mirrors could be provided at the reflecting surfaces 218*b*, 218*c*, 218*d* and 218*e*. The second arm 232 would then block the space between the mirrors at surfaces 218*b* and 218*c*.

The bill validator 10 will go out of service when no additional bills can be inserted into the magazine 201. To service the bill validator to put it back into service, the magazine 201 can be removed and replaced by an empty magazine, or all or a portion of the bills within the magazine can be removed through the door 210. In accordance with the present invention, the status of the magazine can be monitored and the bill validator 10 can be automatically put back into service after a service call is made. The particular criteria for determining that a service call has been made can vary.

Removal of a full magazine can be detected by the microprocessor 300 by the actual level of light detected or a change in the intensity of light detected by the phototransistor 66*b*, for example. When the tab 232 is removed from the recess 234 as the magazine 201 fills, the intensity of the detected light will be at a peak. When the magazine 201 is removed, the prism 218 can no longer reflect light emitted by the LED 66*a* to the phototransistor 66*b*. The intensity of light detected by the phototransistor 66*b* will then drop to a minimum. When an empty magazine is reattached to the bill validator 10, the second arm 232 will again be positioned within the recess 234. While the second arm 232 will then block passage of light through the prism 218, about 20% of the light impinging upon the prism face 218*a* can be detected by the phototransistor 66*b* due to spurious reflection and leakage through the prism 218. A sufficient change in the level of light detected from a predetermined level when the magazine is reattached can be used to determine whether the bill validator 10 can go back into service. For example, the level of light detected when the magazine is empty can be stored in the microprocessor 300 before the bill validator 10 leaves the factory. A change of about 50% can be used to indicate that the magazine has been removed. The level of light detected when the bill validator 10 went out of service could also be stored. A 10% decrease from that level could be used to indicate that the magazine 201 has been reattached. Other levels of detected light can be stored and used, as well.

If, instead of removing the magazine 200, the service person removed enough of the stacked bills for the tab 232 to return into the recess 234, the microprocessor 300 can sense the change in light level from the high intensity to a lower intensity, and again put the bill validator back in service. For example, the level of light detected when the bill validator 10 went out of service can be stored in the microprocessor 300. If that level of light decreases by about 10%, or more, for example, indicating that bills have been removed and the second arm 232 has entered the recess 234, the microprocessor 300 can turn on the stacking motor 178. If the motor 178 can go through a complete rotation and the bill can be stacked, the bill validator can be put back into service. In the preferred embodiment, the removal of 25–35 bills will be sufficient for the second arm 232 to reenter the recess 234. Once again, particular criteria for putting the bill validator into service can vary.

The level of light detected could also be used to determine if the magazine 201 is full and should go out of service. The location of the L-shaped arm 236 or the length of the second arm 232 could be varied so that the second arm 232 is removed from the recess 234 when the magazine is full.

As discussed above with regard to FIG. 2, the LED/phototransistor pair 66*a*, 66*b* and the prism 218 can also be used to determine if the trailing edge of the bill has passed that point, indicating that the bill is in position for stacking. While the actual level of light detected when a bill passes will depend in part on whether the second arm 232 is in the recess 234, the change in light detected as the bill passes can be used to determine that a bill has passed and is in position for stacking.

In an alternative embodiment, detecting whether the bill is in proper position for stacking using the LED/phototransistor pair 66*a*, 66*b* supplements the monitoring of the bill position by monitoring the rotation of the drive rollers 18 and corresponding driven rollers 20 and 24 showing in FIG. 1. If the bill was held or otherwise prevented from advancing to the proper position for stacking, the bill may slip against the driven rollers 20, 24 with the drive rollers 18 rotating a sufficient amount to falsely indicate that the bill has advanced to the proper position for stacking. However, in such an embodiment, no credit will be given if the LED/phototransistor pair 66*a*, 66*b* does not confirm that the bill's trailing edge has past that point and that the bill is in proper position for stacking. Thus, detecting whether the bill is in the proper position for stacking using the LED/phototransistor pair 66*a*, 66*b* provides an additional security measure against fraud and system malfunction.

Another optional function of the optical sensor described is to indicate that the magazine 201 has been removed. This information can be used by the microprocessor 300 to put the bill validator out of service, even if the magazine 201 is not full.

We claim:

1. A bill validator comprising:

a removable magazine for storing bills, comprising a front portion through which bills are inserted into the magazine and a rear wall opposite the front portion, a pressure plate which moves along a path within the magazine in a first direction as bills are inserted into the magazine and in a second direction as bills are removed from the magazine, and first and second reflecting surfaces exposed to an exterior of the magazine;

a light source proximate the first reflecting surface, the light source directing light toward the first reflecting surface, which reflects the light to the second reflecting surface; and a photodetector proximate the second reflecting surface, the photodetector detecting light reflected from the second reflecting surface and generating an output signal corresponding to the level of light detected which is indicative of the status of the magazine.

2. The bill validator of claim 1, wherein the output signal of the photodetector indicates that the magazine is full.

3. The bill validator of claim 1, wherein the output signal of the photodetector indicates that the magazine has been removed from the bill validator.

4. The bill validator of claim 1, wherein the first and second reflecting surfaces are part of a prism.

5. The bill validator of claim 1, wherein the light source is a light emitting diode.

6. The bill validator of claim 1, wherein the photodetector is a phototransistor.

7. The bill validator of claim 1, wherein the level of light detected by the photodetector is monitored by a control and processing means.

8. The bill validator of claim 1, wherein the output signal of the photodetector indicates that the magazine has been reattached to the bill validator.

9. The bill validator of claim 8, wherein the bill validator is put into service if an empty magazine has been reattached.

10. The bill validator of claim 1, further comprising a bill path along which an acceptable bill is transported to the magazine, wherein the light source is located on one side of the bill path and the first and second reflecting surfaces are located on the other side of the bill path such that the presence of the bill between the light source and the first and second reflecting surfaces causes a higher level of light to be detected by the photodetector.

11. The bill validator of claim 10, wherein the light source and the reflecting surfaces are positioned such that when a trailing edge of the bill no longer obstructs the light path between the light source and the reflecting surfaces, the bill is in position for stacking.

12. The bill validator of claim 10, wherein the level of light detected by the photodetector is monitored by a control and processing means.

13. The bill validator of claim 1, further comprising a space between the first and second reflecting surfaces, and a blocker having a first arm protruding into the path of the pressure plate and a second arm which can be selectively moved into and out of the space, based on the movement of the blocker such that the second arm blocks at least a portion of light crossing the space when the arm is moved into the space.

14. The bill validator of claim 13, wherein, when the magazine is full of bills, the second arm is completely removed from the space and a high level of light is detected by the photodetector and if sufficient bills are removed from the magazine such that the second arm returns to the space, a lower level of light is detected by the photodetector.

15. The bill validator of claim 14, wherein, if the bill validator is out of service, it is put into service if the lower level of light is detected.

16. The bill validator of claim 14, wherein the bill validator is put back into service if a bill can be stacked after the lower level of light is detected.

17. The bill validator of claim 13, wherein the first arm protrudes into the path of the pressure plate between the pressure plate and the rear wall of the magazine and the second arm protrudes into the space between the first and second reflecting surfaces when the magazine is not full, such that the second arm is removed from the space as the pressure plate recedes in the magazine and reenters the space as the pressure plate moves forward in the magazine, the second arm blocking at east a portion of the light reflected from the first to the second reflecting surface when the second arm is in the space.

18. The bill validator of claim 17, wherein the first and second reflecting surfaces are part of a prism, the space between the first and second reflecting surfaces being defined in part by a recess in the prism.

19. The bill validator of claim 17, wherein the first and second reflecting surfaces are part of a prism comprising a face through which light enters at a first location and exits at a second location, the space between the first and second reflecting surfaces being defined in part by a recess in the prism; and the prism further comprising third and fourth reflecting surfaces, wherein light entering the prism is reflected from the first reflecting surface to the second reflecting surface in a first direction, the second reflecting surface reflecting the light to the third reflecting surface, which reflects the light in a second direction opposite the first direction to the fourth reflecting surface, and the fourth reflecting surface, which reflects the light out of the face, such that light exits the prism at the second location adjacent and proximate the first location.

20. The bill validator of claim 17, wherein the light source is a light emitting diode.

21. The bill validator of claim 17, wherein the photodetector is a phototransistor.

22. The bill validator of claim 17, wherein the pressure plate has four edges and a tab extends from one of the edges, the tab engaging the first arm as the pressure plate recedes in the magazine.

23. The bill validator of claim 17, wherein the level of light detected by the photodetector is monitored by a control and processing means.

24. A removable magazine for storing bills in a bill validator, the magazine comprising:

a front portion through which bills are inserted into the magazine and a rear wall opposite the front portion;

a pressure plate which moves in a path within the magazine in a first direction as bills are inserted into the magazine and in a second direction as bills are removed from the magazine; and first and second reflecting surfaces wherein light from a light source in the bill validator can be reflected from the first reflecting surface to the second reflecting surface and the light reflected from the second reflecting surface varies in intensity depending upon.

25. The magazine of claim 24, further comprising a space between the first and second reflecting surfaces, and a blocker having a first arm protruding into the path of the pressure plate and a second arm which can be selectively moved into and out of the space based on the movement of the pressure plate, such that the second arm blocks light crossing the space when the arm is moved into the space.

26. The magazine of claim 25, wherein the first arm protrudes into the path of the pressure plate between the pressure plate and the rear wall, the second arm being removed from the space as the pressure plate moves in the first direction and reenters the space as the pressure plate moves in the second direction.

27. The magazine of claim 26, wherein when the magazine is full of bills the blocker is completely removed from the space and a high level of light is detected by the photodetector and if sufficient bills are removed from the magazine such that the second arm is within the recess, a lower level of light is detected by the photodetector.

28. The magazine of claim 27, wherein the first and second reflecting surfaces are part of a prism, the space between the first and second reflecting surfaces being defined in part by a recess in the prism.

29. The magazine of claim 25, wherein if the bill validator is out of service, it is put back into service if the lower level of light is detected.

30. The magazine of claim 29, wherein the bill validator is put back into service if a bill can be stacked after the lower level of light is detected.

31. A bill validator comprising:

a removable magazine for storing bills, comprising a front portion through which bills are inserted into the magazine and a rear wall opposite the front portion, a pressure plate which moves in a first direction as bills are inserted into the magazine and in a second direction as bills are removed from the magazine, and a prism having a first face exposed to the exterior of the magazine, a light emitting diode proximate the prism for directing light into the prism;

a phototransistor proximate the prism for receiving light exiting the prism; and control and processing means monitoring the level of light detected by the phototransistor such that, when the magazine is removed from the bill validator, a low level of light is detected and when the magazine is reattached to the validator, a higher level of light is detected.

32. The bill validator of claim 31, wherein the control and processing means puts the bill validator into service when the higher level of light is detected.

33. The bill validator of claim 31, wherein the control and processing means puts the bill validator back into service if a bill can be stacked after the lower level of light is detected.

34. The bill validator of claim 31, wherein the light emitting diode and phototransistor are on one side of a bill path and the prism is on an opposite side of the bill path, such that the presence of the bill between the light emitting diode and the prism causes a lower level of light to be detected by the phototransistor.

35. The bill validator of claim 34, wherein the light emitting diode and the prism are arranged along the bill path such that when the trailing edge of the bill is no longer between the light emitting diode and the prism, the bill is in position for stacking.

36. The bill validator of claim 31, wherein the prism further comprises a recess and at least a portion of light directed into the prism is reflected across the recess prior to exiting the prism; and the magazine further comprises a blocker having a first arm protruding into the path of the pressure plate between the pressure plate and the rear wall, and a second arm which can be selectively moved into and out of the recess based on the movement of the pressure plate, such that the second arm blocks at least a portion of the light crossing the recess when the arm is moved into the recess.

37. The bill validator of claim 36, wherein the second arm is removed from the recess as the pressure plate moves in the first direction and reenters the recess as the pressure plate moves in the second direction, such that, when the magazine is full of bills the blocker is completely removed from the recess and a high level of light is detected by the phototransistor and if sufficient bills are removed from the magazine such that the second arm reenters the recess, a lower level of light is detected by the phototransistor.

38. The bill validator of claim 37, wherein if the bill validator is out of service, it is put back into service if the lower level of light is detected.

39. The bill validator of claim 37, wherein the control and processing means puts the bill validator back into service after the lower level of light is detected.

* * * * *

UNITED STATES PATENT AND TRADEMARK OFFICE

CERTIFICATE OF CORRECTION

PATENT NO. : 5,616,915

DATED : April 1, 1997

INVENTOR(S) : Simpkins et al.

It is certified that error appears in the above-identified patent and that said Letters Patent is hereby corrected as shown below:

Item [56] "References Cited", cancel "5,200,022" and insert --5,100,022--.

Col. 17, line 45 (claim 17), cancel "east" and substitute --least--.

Col. 18, line 24 (claim 24), after "upon", insert --the status of the magazine--.

Signed and Sealed this

Sixteenth Day of June, 1998

Attest:

Bruce Lehman

BRUCE LEHMAN

*Attesting Officer*

*Commissioner of Patents and Trademarks*